(12) United States Patent
Hufenbach et al.

(10) Patent No.: US 12,420,959 B2
(45) Date of Patent: Sep. 23, 2025

(54) FLIGHT UNIT FOR AN AIRCRAFT

(71) Applicant: GERMANIUM SKIES GMBH, Dresden (DE)

(72) Inventors: Werner Hufenbach, Dresden (DE); Jens Werner, Coswig (DE)

(73) Assignee: GERMANIUMTECH GMBH, Dresden (DE)

( * ) Notice: Subject to any disclaimer, the term of this patent is extended or adjusted under 35 U.S.C. 154(b) by 0 days.

(21) Appl. No.: 18/273,069

(22) PCT Filed: Jan. 12, 2022

(86) PCT No.: PCT/DE2022/100019
§ 371 (c)(1),
(2) Date: Jul. 19, 2023

(87) PCT Pub. No.: WO2022/156854
PCT Pub. Date: Jul. 28, 2022

(65) Prior Publication Data
US 2024/0002044 A1    Jan. 4, 2024

(30) Foreign Application Priority Data

Jan. 20, 2021 (DE) .......................... 102021101115.9
Jan. 20, 2021 (DE) .......................... 102021101116.7

(51) Int. Cl.
| | |
|---|---|
| *B64U 10/13* | (2023.01) |
| *B64C 3/38* | (2006.01) |
| *B64C 27/20* | (2023.01) |
| *B64C 27/22* | (2006.01) |
| *B64D 1/22* | (2006.01) |
| *B64U 30/12* | (2023.01) |
| *B64U 101/61* | (2023.01) |

(52) U.S. Cl.
CPC .............. *B64U 10/13* (2023.01); *B64C 3/385* (2013.01); *B64C 27/22* (2013.01); *B64D 1/22* (2013.01); *B64U 30/12* (2023.01); *B64C 27/20* (2013.01); *B64U 2101/61* (2023.01)

(58) Field of Classification Search
CPC ..... B64C 3/385; B64C 29/02; B64C 29/0025; B64U 10/20
See application file for complete search history.

(56) References Cited

U.S. PATENT DOCUMENTS

| | | |
|---|---|---|
| 5,823,462 A | 10/1998 | Bothe |
| 5,823,468 A | 10/1998 | Bothe |

(Continued)

FOREIGN PATENT DOCUMENTS

| | | |
|---|---|---|
| CN | 102285450 A1 | 12/2011 |
| WO | 2019114885 A1 | 6/2019 |
| WO | 2019221071 A1 | 11/2019 |

*Primary Examiner* — Nicholas McFall
(74) *Attorney, Agent, or Firm* — Abel Schillinger, LLP

(57) ABSTRACT

The invention relates to a flight unit for a vertical take-off and landing aircraft with a plurality of drive units arranged on a wing assembly, wherein the wing assembly comprises longitudinally extended wing assembly struts connected to one another at node points. According to the invention, a certain number of the wing assembly struts each comprise at least one wing with aerofoil form, which wing is arranged or configured for rotation in a longitudinal section of the wing assembly strut which extends longitudinally between two nodes.

13 Claims, 15 Drawing Sheets

(56) References Cited

U.S. PATENT DOCUMENTS

| | | |
|---|---|---|
| 2017/0057630 A1 | 3/2017 | Schwaiger |
| 2017/0327218 A1* | 11/2017 | Morin .................... B64U 10/20 |
| 2018/0002026 A1 | 1/2018 | Oldroyd et al. |
| 2020/0086986 A1 | 3/2020 | Legrand et al. |
| 2021/0064062 A1 | 3/2021 | Katayama et al. |
| 2021/0070436 A1 | 3/2021 | Werner et al. |

* cited by examiner

-enlarged-

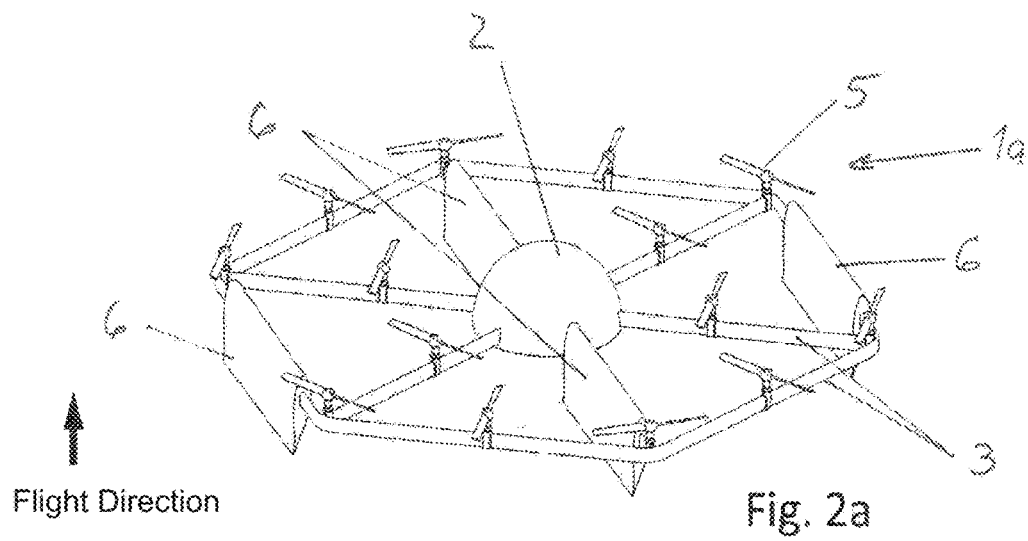
Flight Direction    Fig. 2a
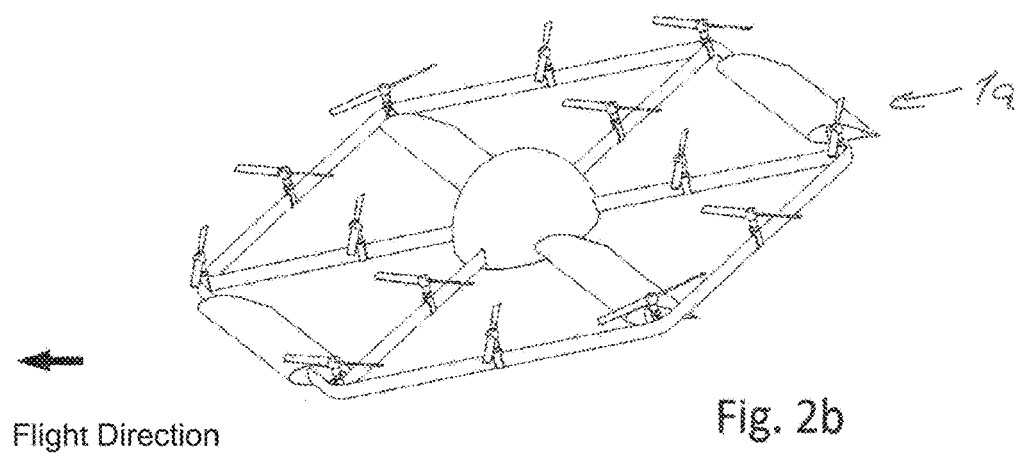
Flight Direction    Fig. 2b
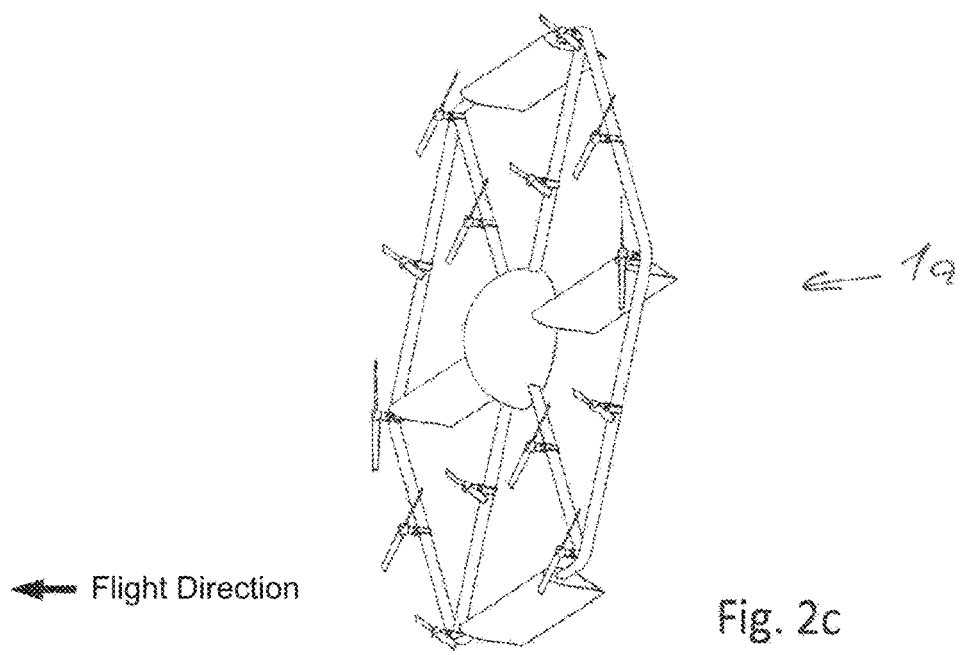
Flight Direction    Fig. 2c Flight Direction Flight Direction Flight Direction Flight Direction Flight Direction Flight Direction Flight Direction Flight Direction Flight Direction

FLIGHT UNIT FOR AN AIRCRAFT

BACKGROUND OF THE INVENTION

1. Field of the Invention

This invention relates to a flight unit for a vertical take-off and landing aircraft with several drive units arranged on one wing assembly, wherein the wing assembly has interconnected wing assembly struts.

2. Discussion of Background Information

A flight module of the above type for a vertical take-off and landing aircraft is known from publication WO 2019/114885 A1, comprising a number of drive units each with a propeller, arranged on wing assembly struts.

The flight module has several air deflectors on the outer circumference of the wing assembly. These are arranged on one side at the outer node points of the interconnected wing assembly struts in rotational mountings.

In addition to the flight module, the aircraft, familiar from state-of-the-art technology, can incorporate any transport module that can be coupled to the transport module.

While the aircraft is taking off or landing, for the most part vertically with the flight module, the flight module is essentially horizontal to the ground (horizontal flight attitude).

While the aircraft is cruising, which essentially means that the flight module is engaged in horizontal forward flight, the flight module is basically pointing at the ground at an inclined angle (inclined flight attitude).

Disadvantages of the state-of-the-art solution arise firstly from the arrangement of air deflectors on the outer circumference of the wing assembly, causing the flight module to protrude, causing interference during the take-off and landing process because, when the aircraft is taking off or landing, space is usually restricted which means that the air deflectors need to be retracted during take-off and landing operations so can no longer be used for deflecting airflow and controlling the flight characteristics of the flight module.

Another disadvantage is that the one-sided mounting and support of the air deflectors during operation of the flight module or aircraft also generates a considerable bending load on the air deflectors or their connection to the wing assembly, creating an unfavourable mechanical load on the wing assembly.

Furthermore, the number of propellers being operated cannot be adapted to deliver the drive power needed for any given flight phase. By way of example, with the inclined flight module in a forward flight phase rather than a climbing or descending phase while the flight module is oriented horizontally, less drive power is required and this could allow a certain number of drive units to be switched off.

However, when the flight module is in an inclined position, the rotor blades of the propellers of switched-off drive units—despite adjustable inclination angle of the propellers and adjustable angle of approach of the rotor blades—create unfavourable air resistance due to the partial lateral inflow, causing significant disturbance to the optimum flow pattern and therefore impairing the flight characteristics of the flight module, meaning that they therefore need to continue to be operated even with the flight module in an inclined position.

This reduces the efficiency of the drive units (technical utilization level of equipment in relation to the lift and thrust provided), especially while the inclined flight module is in a horizontal forward flight phase, which in turn restricts the achievable cruising speed of the aircraft.

This invention is based on the object of providing a flight unit with higher efficiency in terms of design and operation while at the same time delivering improved flight characteristics.

In particular, the installation space required for the flight unit and the mechanical stress applied to the wing assembly should be reduced, accompanied by an assured improvement to aerodynamics and flight stability during every flight phase and flight attitude respectively.

SUMMARY OF THE INVENTION

The wing with an aerofoil shape, also called aerofoil surface, preferably has a rounded leading edge at the front, viewed in the direction of airflow, to direct airflow onto the wing, and preferably a tapering trailing edge at the rear, also viewed in the direction of airflow, to direct airflow away from the wing.

The wing has an inflow surface on its upper side that is curved in relation to the inflow surface on its underside, which deflects and accelerates the air flow across the top of the wing to generate dynamic lift in response to this incoming airflow, causing negative pressure on top of the wing and positive pressure on the underside of the wing.

Preferably, the inflow surface, the leading edge, of the top of the wing should be convex in shape.

The inflow surface of the lower wing surface is curved in relation to the inflow surface of the upper wing surface in such a way that the acceleration of the airflow over the leading edge of the upper wing surface is always greater than across the leading edge of the lower wing surface in order to generate dynamic lift.

The leading edge of the underside of the wing can be convex to concave in shape.

The wing is arranged or configured across a defined longitudinal section of the longitudinally extended wing assembly strut, referred to as the wing section of the wing assembly strut.

The wing or wings section of the wing assembly strut can border at least one further longitudinal section of the associated wing assembly strut that holds the wing and is therefore referred to as the support section.

The wing and/or the wing section can also extend across the full distance between two node points.

The wing section or the wing section together with the support section(s) perform(s) the required support function of a wing assembly strut bridging the distance between two node points on the wing assembly as well as the support function of a wingless wing assembly strut.

Node points of the wing assembly are the connection points between two wing assembly struts or between a wing assembly strut and another integral functional object of the wing assembly, e.g., preferably a centrally arranged unit for open-loop and closed-loop control of the flight unit (central unit).

The central unit may have technical functional units such as control, positioning and/or communication technology and/or a charging module and/or technical tools to assist with in-flight safety.

Preferably, the central unit may be arranged centrally in relation to a central axis M on the flight unit such that the central axis of the central unit extends across the central axis M of the flight unit. By way of example, the central unit may have a housing, e.g., in the form of a hemisphere or an ellipsoid, for the accommodation of technical functional elements.

The wing assembly struts on the wing assembly can be mounted with one end on or in the central unit housing and extend radially outwards from the central unit.

The wing has a cross-sectional area for the generation of dynamic lift that is significantly larger than the cross-sectional area of the associated wing assembly strut.

This means that the cross-section profile of the wing substantially exceeds the cross-section profile of the corresponding wing assembly strut. In other words, when extended transversely, the wing is significantly larger than the wing assembly strut in its transversely extended position.

Preferably, the wing arranged or configured in the wing section, when extended longitudinally, is also arranged or configured in the direction of the longitudinal extension of the wing assembly strut.

In the manner described above, the wing assembly strut can have a wing arranged in the wing section area of a wing, or may itself, as described above, be designed as a wing in its own right.

In accordance with this invention, the wings are arranged or configured with the ability to rotate.

With this combined design of wing assembly comprising interconnected wing assembly struts, which in each case alternatively or additionally to the drive units arranged on the wing assembly struts may have adjustable wings, arranged or configured with the ability to rotate on the wing assembly struts, a space-efficient and structurally favourable integration of wings within the wing assembly can be achieved on the one hand while operation of the flight unit in different flight positions can be better adapted to suit prevailing flow conditions on the other hand, enabling the aerodynamic properties of the flight unit to be improved substantially.

To deliver this solution, the invention founds upon a number of things, for example on the realization that, during forward flight of the aircraft with the known flight module and with increasing inclination of the flight module, an increasing propulsion effect is produced by the drive power of the propellers, although, detrimentally, this reduces the amount lift available.

The invention is further based on the knowledge that in an up-tilt phase or a down-tilt phase of the known flight module, in which it is in transition from vertical climb flight to horizontal straight-ahead or forward flight or in transition from horizontal straight-ahead or forward flight to vertical descent flight, respectively, the ratio of the propulsion power and lift power generated by the propellers is reversed and the reciprocal relationship between propulsion and lift leads to undesirable effects, reversing the propulsion power and lift power generated by the propeller and causing the reciprocal interaction of propulsion and lift to lead to undesirable effects in the flight characteristics of the flight module.

The invention is further based on recognition of the fact that, for example, during the climb or descent of the aircraft with the known flight module, lateral wind factors are very prone to affect the lift effect of the propellers detrimentally.

A particular aerodynamic advantage of integrating the wings in the support structure is that they can also be exposed to additional airflow from the propellers of the drive units, something which is not possible with the externally arranged air deflectors of the known flight module.

Due to the slipstream from the propellers across the wings integrated in the support structure, these can also be used to great effect for certain manoeuvres during take-off/landing/tilting up/tilting down at low airspeeds of the flight unit because, also during these phases, the special additional airflow can produce an aerodynamic force that supports the flight manoeuvre.

To further improve the aerodynamics of the flight unit in accordance with this invention, the rotatable wing is arranged in such a way that the ratio of lift power to propulsion power can be controlled better and can therefore be stabilised during forward flight, climbing or descending and during the up-tilt phase or down-tilt phase.

The ability of the wings to rotate means that their attitude can be adjusted to reflect the flight status of the flight unit to stabilise or to control flight characteristics. This means that they can be used like tailplanes to support and improve the position of the flight unit during certain manoeuvres such as take-off/landing/tilting up and tilting down.

In turn, this means that the wings can be adjusted in vertical climb or descent of the flight unit during take-off and landing of the aircraft with all drive units operating with the leading surfaces aligned essentially perpendicular to the ground, enabling the lift generated by the propellers in the drive units to act unencumbered, with the flight unit in a flight attitude that is horizontal to the ground and is not impeded by the leading surfaces of the wings. In addition, the wing position of the wing receiving airflow from the propellers is able to support vertical lift of the flight unit and to stabilise it in relation to lateral flow factors. At this time, the wings acts as side rudders providing resistance to lateral displacement vertically in relation to the leading surface of the wings.

Alternatively, for vertical climbing or descent, the wings can be set to an actuation angle that diverges from vertical position relative to the ground which means that they also exert a force during vertical climbing and descent that leads to a predetermined sideways movement or rotational movement of the flight unit.

In a tilt-up phase, in which the flight unit is in transition from vertical climb to horizontal forward flight, the aircraft is tilted from a horizontal flight attitude into a flight attitude inclined relative to the ground, in order to realise cruise operation, the wings can be so inclined/obliquely oriented relative to the ground that during the operation of some individual drive units the leading surfaces of the wings experience a flow around them and generate dynamic lift which supports the upward tilting of the flight unit in a targeted manner.

Similarly, in a tilt-down phase, in which the flight unit is in transition from horizontal forward flight to vertical descent from an almost perpendicular flight attitude into a flight attitude inclined relative to the ground, the wings can be so inclined/obliquely oriented relative to the ground that during the operation of some individual drive units the leading surfaces of the wings experience a flow around them and generate dynamic lift which supports the downward tilting of the flight unit in a targeted manner that slows down the aircraft.

This additional airflow across the wing can strongly influence the lift component during the tilt-up or tilt-down phase creating more scope for the use and operation of the drive units.

The wings, experiencing this airflow from the downwash of the propellers, can also deflect this downwash from the propellers, wherein the resultant momentum can create more lift during the tilt-up phase and/the tilt-down phase. The faster the flight unit and/or the aircraft flies, that speed can be further increased by this relative airflow.

For example, in order to support this tilting action, the rear/upper wings as viewed in the direction of flight could be angled slightly more than the front/lower wings in the direction of flight. Viewed in the forward direction of flight, this would generate more lift through these rear/upper wings than through the front/lower wings. This, viewed in the reverse direction of flight, would move the flight unit upwards without requiring greater thrust from the propellers.

During what is primarily the horizontal forward flight of the flight unit employed for the cruising mode of the aircraft, in which the flight unit is substantially in a steep/nearly vertical flight attitude with respect to the ground, the wings can be positioned in a horizontal orientation in relation to the ground such that, during operation of some individual drive units, the leading edges of the wings experience flow around them, causing them to generate dynamic lift which in turn stabilises the forward flight of the flight unit and which improves the flight performance of the flight unit in forward flight.

At best, with an almost completely perpendicular flight attitude of the flight unit during horizontal forward flight, the propellers of the drive units are used almost exclusively for propulsion and the wings become responsible for delivering almost all of the lift. In this instance, since the propellers are pointing in the direction of flight, the wings receive optimum airflow and work to deliver lift at maximum efficiency.

Consequently, this also means that, with the support of dynamic lift from the wings in forward flight mode, less propulsive power is needed from the drive units which in turn means that the flight unit can be designed to be smaller in terms of size and mass.

Consequently, this higher efficiency enables fuel to be saved, or longer flight distances can be covered.

The ability to rotate the wings is also advantageous in compensating for airflow interference such as that caused by storms or turbulence in the airspace because the wings can be positioned accordingly.

For operation of the flight unit in relating to adapting to prevailing airflow conditions in different flight attitudes and environmental situations, rotational adjustment of the wings is preferably designed to be controllable individually and/or in groups.

The longitudinal section that features the wing (wing section) can include the entire length of the longitudinally extended wing assembly strut or just part of the longitudinally extended wing assembly strut.

According to the invention, the wings can extend over the entire length of the longitudinally extended wing assembly strut—i.e., from node point to node point of the wing assembly—or be connected on one or both sides of its longitudinal extension with a longitudinal section of the wing assembly strut (support section).

Preferably, as in the last-named case, the wings are enclosed on both sides by a support section.

On the one hand, this provides a stable mounting for the wing and, on the other hand, a certain distance between the wing and the other wing assembly struts of the wing assembly and the drive units which, among other things, allows greater degrees of freedom for the swivelling range of the wing which in turn means less reciprocal airflow influence between the propellers and the wings.

Advantageously, the wing arranged or configured on the wing section is designed for rotational movement around a longitudinal axis of the wing assembly strut.

In this respect, a wing arranged or designed in the wing section of the wing assembly strut may be designed or arranged to rotate about the longitudinal axis of the wing assembly strut relative to the wing section and/or relative to the adjoining support section(s) of the wing assembly strut.

Likewise, the wing section and/or the adjoining support section(s) of the wing assembly strut can also be designed or arranged to rotate about its longitudinal axis relative to the fixed node point(s) of the wing assembly and/or relative to a fixed support section of the wing assembly strut.

These embodiments are made possible by a particularly space-saving and weight-saving arrangement and functional method of the wing across the full length of the wing assembly strut on the wing assembly.

The embodiment in which the wing is arranged or configured to enclose the wing section of the wing assembly strut also implements an arrangement and mode of operation for the wings on the wing assembly that is particularly compact and lightweight.

Having the wing assembly strut enclosed by the wing also has the advantage that the wing assembly as well as the individual wings can be dimensioned in accordance with their specific load requirements and are therefore not affected adversely by the load-bearing effect of the wing on the wing assembly.

In addition, the design mounting of the wing and the way load is introduced to the wing assembly has been simplified because during operation, the proportion of bending loads is reduced and force is introduced in a linear fashion, distributed along the length of the wing instead of only at the end points as it is with the state-of-the-art air deflectors.

In a specific embodiment, the wing can be arranged or designed to rotate against the adjacent support section(s).

In this embodiment, by way of example, the rotary bearing for rotational adjustment of the wing position can be arranged directly at or in both ends of the longitudinally extended wing which means that the wings and/or the wing section can be adjusted to rotate relative to the adjacent, non-rotationally fixed/rigid support section(s).

This embodiment provides the simplest manufacturing design and embodiment for the wing tilting adjustment facility relative to the wing assembly struts.

The arrangement of rotary bearings directly on or in the two ends of the wing creates a stable mounting for the wing and makes it problem-free to replace the wing, e.g., for an application-specific profile change.

The bending load on the support sections caused by airflow to the wing can be compensated for by the appropriate design of the rotary bearings. For example, spherical roller bearings that allow a certain angular position of the bearing elements in relation to each other, enabling the rotary mountings simultaneously to provide an angular decoupling function.

In an alternative embodiment, the support section is arranged or configured with the ability to rotate relative to another support section of the same wing assembly strut and/or relative to a node point of the wing assembly associated with the wing assembly strut.

In other words, a part of a wing assembly strut or a support section may be arranged or configured with the ability to rotate with respect to another part of the same wing assembly strut or the same support section and/or can be arranged or configured with the ability to rotate with respect to a node point associated with the wing assembly strut.

In this embodiment, the adjacent wing assembly strut section(s) or a part of the adjacent wing assembly strut section(s) can be rigidly connected to the wing arranged or configured at the wing section and, for example, be arranged at its opposite end in the transition to the support section which does not have the ability to rotate (the other part of the support section) of the same wing assembly strut and/or in the transition to a node point of the wing assembly strut of the wing assembly rotary bearing for the rotary position of the wing, meaning that the wing in the wing section together with the adjacent support section (part of the support section) can be adjusted rotationally relative to the non-rotational support section (the other part of the support section) or relative to the node point of the wing assembly.

The support sections adjacent to the wing and rigidly connected to it therefore represent rotatable shafts that enclose and support the wing.

This arrangement generates a lower level of bending load in the individual support sections because, as a consequence of the airflow across the wings, the bending load is distributed uniformly across the wings and is exerted on the support sections that are rigidly connected to it.

The bending load resulting from the airflow across the wing causes an angular change in the support section(s) connected to the rotatable wing in relation to the support section(s) designed to be non-rotatable or in relation to the associated node point(s) of the wing assembly, which is compensated for by the corresponding design of the external rotary bearings. For example, spherical roller bearings that allow a certain angular position of the bearing elements in relation to each other can simultaneously function as angular decoupling.

This relieves a substantial amount of bending load from the wing assembly which improves the stability of the wing assembly and the flight characteristics of the flight unit.

If the rotary bearings are advantageously arranged near the corresponding node points of the wing assembly strut of the wing assembly, this further reduces the bending load exerted on the wing assembly strut and therefore also on the wing assembly.

In another advantageous embodiment, the wing can be arranged or configured with the ability to rotate relative to the wing section.

In this embodiment, the rotary bearing(s) for rotational adjustment of the wing can be arranged or configured as integral parts of the wing body or in the wing body, so that the wings can be adjusted rotationally relative to the rotationally fixed wing section and support section(s) of the wing assembly strut.

A single rotary bearing can be used to provide the rotational connection between the wing and the wing assembly strut in the wing section.

Therefore, in contrast to the embodiments mentioned above, the wing assembly strut that supports an arranged wing, is continuous/uninterrupted with an essentially identical cross-section and it forms a rigid axis of rotation for rotational adjustment of the wing.

The wing can have a passage along its longitudinal extension for receiving the continuous wing assembly strut and for receiving the integrated rotary bearing(s).

With this embodiment, the bending load caused by airflow across the wing—especially when using several rotary bearings distributed over the length of the wing section—is absorbed more uniformly across an extended length of the continuous wing assembly strut, thereby significantly reducing deflection of the wing assembly strut and therefore also increasing the stability of the wing assembly here as well as improving the flight characteristics of the flight unit.

As a result, no angular deviations occur in the vicinity of the rotary bearing which means that simpler designs of rotary bearing such as ball bearings or anti-friction bearings can be used in this embodiment.

Advantageously, an angle of approach $\beta$ of the wing(s) can be adjusted across an angular range extending from 0° to 270°.

The rotational position of the wings can be configured to be at least partially adjustable, in particular with an angle of approach $\beta$ enclosed between a defined wing assembly plane E formed by the wing assembly of the flight unit and a central cross-sectional plane of the wing. The wings can be aligned with an angle of approach $\beta$ across a range of 0° to 270° which means that their lift and directional function while in flight can be adapted in every flight phase and flight attitude of the flight unit to perfectly reflect airflow conditions, environmental factors etc.

By varying the angle of approach $\beta$, optimum airflow around and lift performance of the wing can be generated in any flight attitude. Also, by way of example, the lift function of the flight unit can be influenced to advantage in accordance with airflow conditions.

If several wings each with different angles of approach $\beta$ are aligned, the steering and attitude stabilisation function of the flight unit can be improved.

The angle of approach $\beta$ is defined as the larger of the angles formed between the wing assembly plane E and the central cross-sectional plane of the wing in the area of the rear section of the wing, which normally points in the opposite direction to the direction of flight and has a tapered trailing edge.

In cases involving the use of several adjustable wings, the respective angle of approach $\beta$ of the wings can be varied independently of each other and each of the angles of approach $\beta$ of the wings can be controlled individually.

With an angle of approach $\beta$ of 180°, the wing assembly plane E and the average cross-sectional plane of the wing are identical.

This position of the wing/the wings (not shown) can be used, for example, in a necessary deceleration situation (e.g., in the case of unfavourable upwind or downwind conditions) during the climb or descent phase of the flight unit.

With an angle of approach $\beta$ of 90°, the front wing section of the wing with the rounded leading edge is directed steeply upwards and the rear wing section with the pointed trailing edge is directed steeply downwards.

By way of example, this position of the wing/the wings can be used e.g., primarily during the climb or descent phase of the flight unit to support the lift or downforce of the flight unit generated by the propellers during the climb or descent phase and, also by way of example, to stabilise the flight attitude of the flight unit during the climb or descent phase in unfavourable crosswinds.

With an angle of approach $\beta$ of 270° (not shown) the front wing section of the wing with the rounded leading edge is directed steeply downwards and the rear wing section with the tapered trailing edge is directed steeply upwards.

By way of a typical situation, this position of individual wing(s) with an angle $\beta$ of up to 270° can be used during the up-tilt phase or the down-tilt phase of the flight unit to support the tilting up or down of the flight unit and, if necessary, for acceleration, and also to steer and stabilise the flight unit in this flight attitude, inclined in relation to the ground.

The position of the wing(s) with an angle $\beta$ across a range of about 70° to about 110° essentially corresponds to the situation during straight-ahead or forward flight of the flight unit in order to generate optimum airflow around the wing with corresponding improvement in the lift performance of the wing(s) for forward flight and to be able to adjust the desired flight attitude and cruising altitude of the flight unit.

In certain situations, e.g., with the flight unit involved in a necessary deceleration situation or avoidance situation during straight-ahead or forward flight, one or more wings with an angle of approach β of 0° to 180° can be adjusted (not shown) to position the wing counter to the prevailing direction of airflow.

Furthermore, the angle of approach β can be varied in relation to an adjustable angle of inclination α of the flight unit relative to the ground or relative to a gravity line S of the flight unit. Or the wing position in an angle of approach β and the setting of the rotors/propellers of the drive units can influence the inclined angle of the flight unit and therefore the angle of inclination α.

The line of gravity S follows the direction of gravitational force being exerted on the flight unit, i.e., it is always perpendicular to the surface of the Earth (ground). Here, gravitational force is the force exerted by the Earth's gravitational field that acts on the flight unit.

The angle of inclination α of the flight unit is the smaller of the angles formed between the wing assembly plane E and the flight unit's line of gravity S which is always perpendicular. Accordingly, the angle of inclination α always applies between the line of gravity S of the flight unit and the leading edge of the flight unit, which points in the direction of flight, and which can be inclined towards the ground.

The relationships between angles α and β are complex and are determined and optimized, preferably from mathematical models, for each configuration of the flight unit and for any specific use on an aircraft.

By varying the flow and position of the wings during the different flight phases/tilt of the flight unit, a force can be generated which can be used either to change the tilt of the flight unit and/or to increase/reduce the lift.

For example, when the flight unit is tilted to an angle of inclination α in a range >0° and <90°, as provided for, by way of example, during the tilt-down or tilt-up phase, the wings generate decreasing amounts of lift, e.g., when the flight unit is being inclined downwards from a forward flight phase. This can be compensated for by adjusting the angle of approach β of the wing(s).

The optimum angle ratios behave transiently over time and need to be adjusted accordingly across a variable range.

Here are some preferred and approximate setting ranges for the different flight phases:

Vertical take-off: α=90°, β=60°-120°

Tilting up: α=90-45°, β=180-90°

Cruising/forward flight: α=45°-0°, β=45-135°

Tilting down: α=90-45°, β=180-90°

Vertical landing: α=90°, β=60°-120°

To tilt the flight unit, preferably one or more of the front/lower wings as viewed in the direction of flight are positioned opposite one or more rear/upper wings, also viewed in the direction of flight, with a different angle of approach β. The difference between these contrasting levels of force creates a torque around the transverse axis (at right angles to central axis M) of the flight unit and this leads to a upward or downward tilting movement.

The angle difference between the angles of approach β of the wings is preferably:

delta $\beta = \beta_{(wing\ front)} - \beta_{(wing\ back)} = 0\text{-}45°$

With such embodiments and adjustment options for the wing(s), the flight stability of the flight unit can be improved, as well as the lift performance of the flight unit which in turn means that the propulsive power of the drive units can be reduced, and that the efficiency of the flight unit can be increased.

In order to embody the aforementioned modes of operation of the flight unit with the wing(s), control technology can be provided for the flight unit and can, by way of example, be set up and designed for the output of a control signal with switching action that can control the power of the drive units. Furthermore, this control technology can be designed to output a control signal for adjusting the angle of inclination α of the flight unit and the angle of attack β of the wings. The coupling device can accordingly be designed as a controllable coupling device. Furthermore, the control unit of the flight unit can also be designed to issue a control signal to activate a controllable coupling device for coupling or uncoupling the flight unit to or from a transport unit on an aircraft.

In addition, to improve the flight characteristics of the flight unit, provision is made for at least a number of drive units having at least one turbine propeller (referred to as 'impellers').

These impellers have propellers arranged in mainly cylindrically formed flow tubes and, due to their higher specific lift or thrust power, these typically have a smaller diameter than the more commonly used propellers with the same power rating.

It follows from this that the flight unit can be designed with a more favorable size and mass ratio between drive units and wings in favour of wings with larger aerofoils, which, in addition to a more efficient, energy-saving operation of the flight unit, also further improves the aerodynamics of the flight unit.

Advantageous embodiments and further developments of the invention can also be seen in the accompanying drawings.

BRIEF DESCRIPTION OF THE DRAWINGS

Figure 1A:
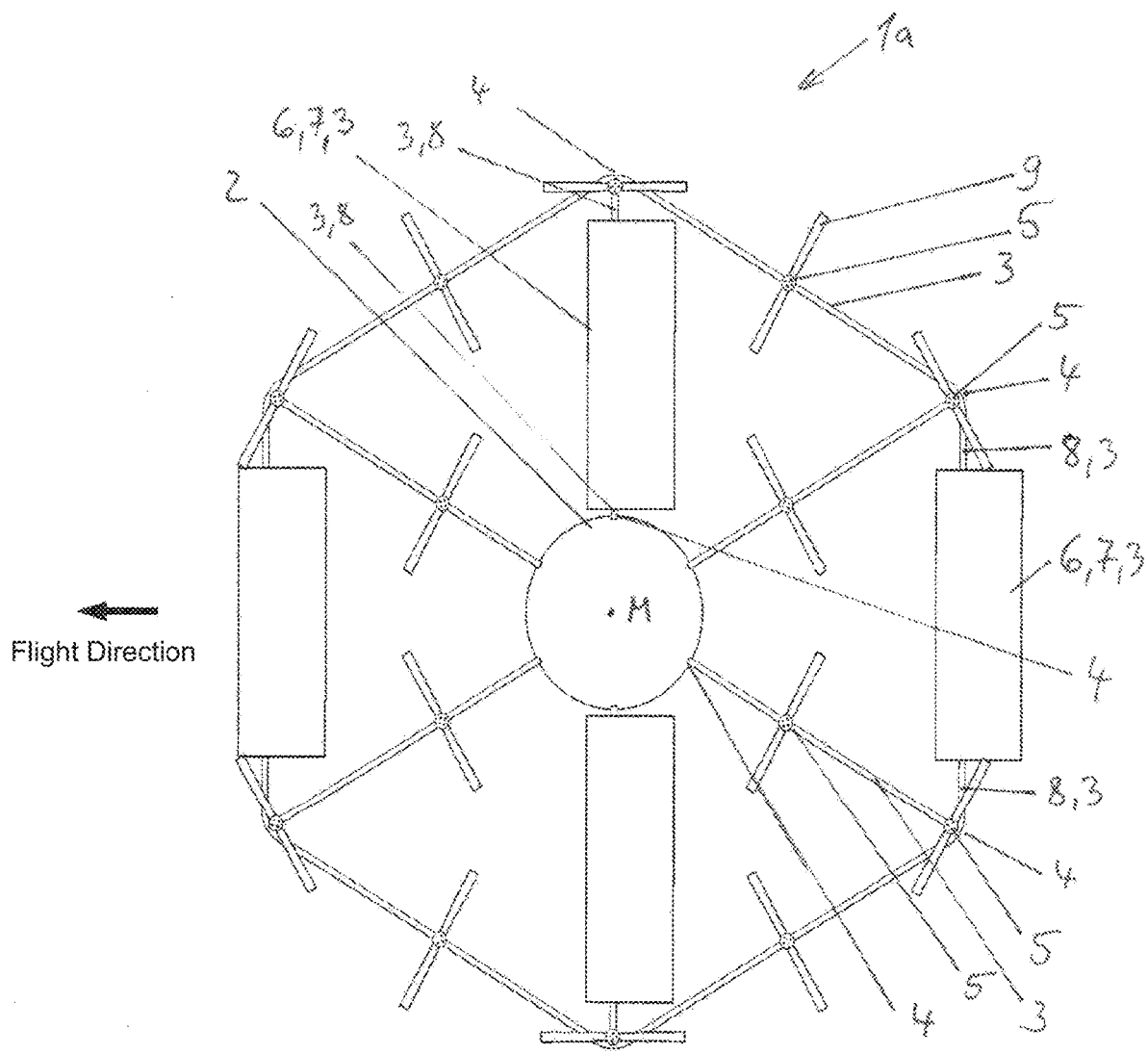
Figure 1B:
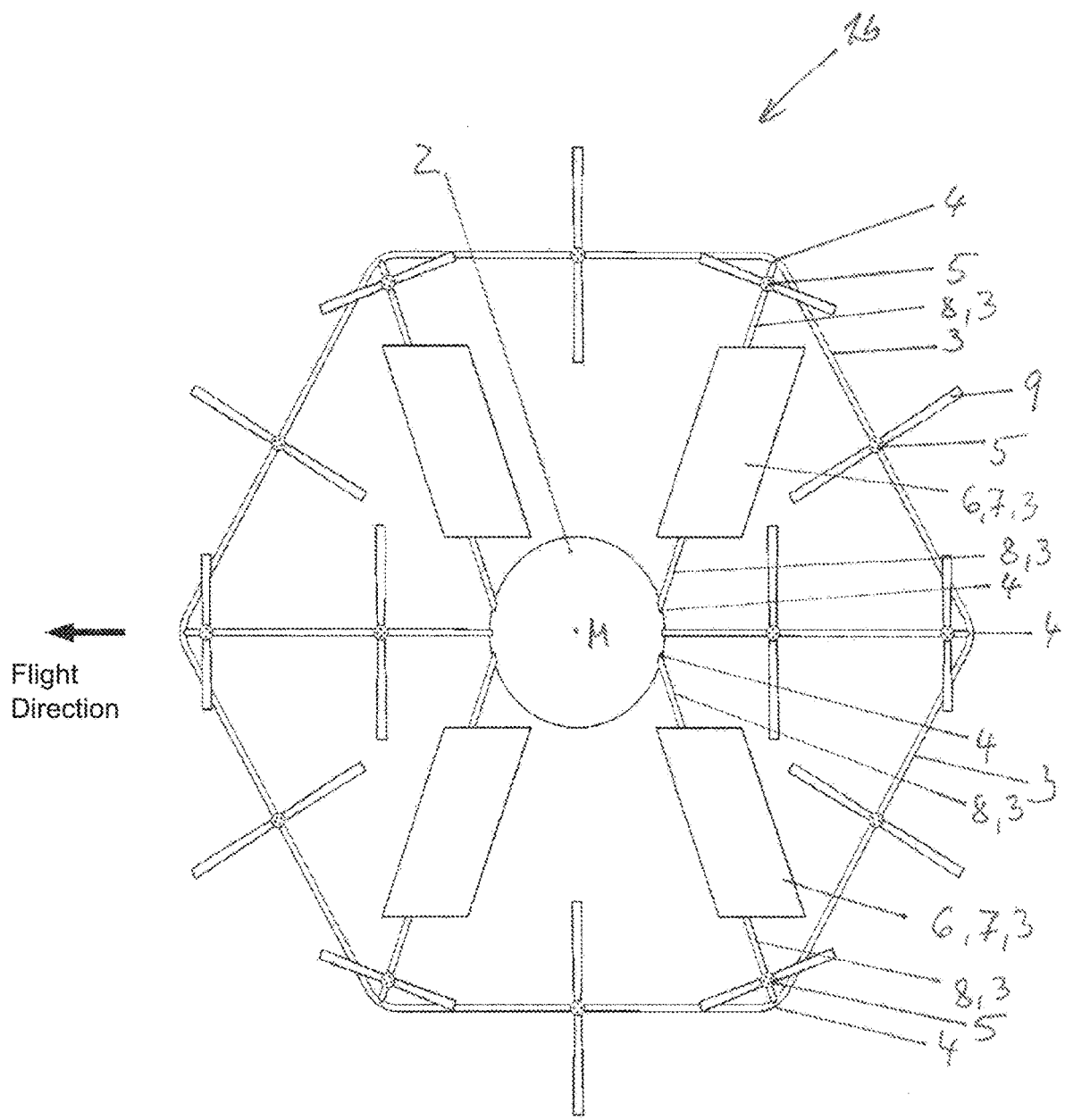
Figure 1C:
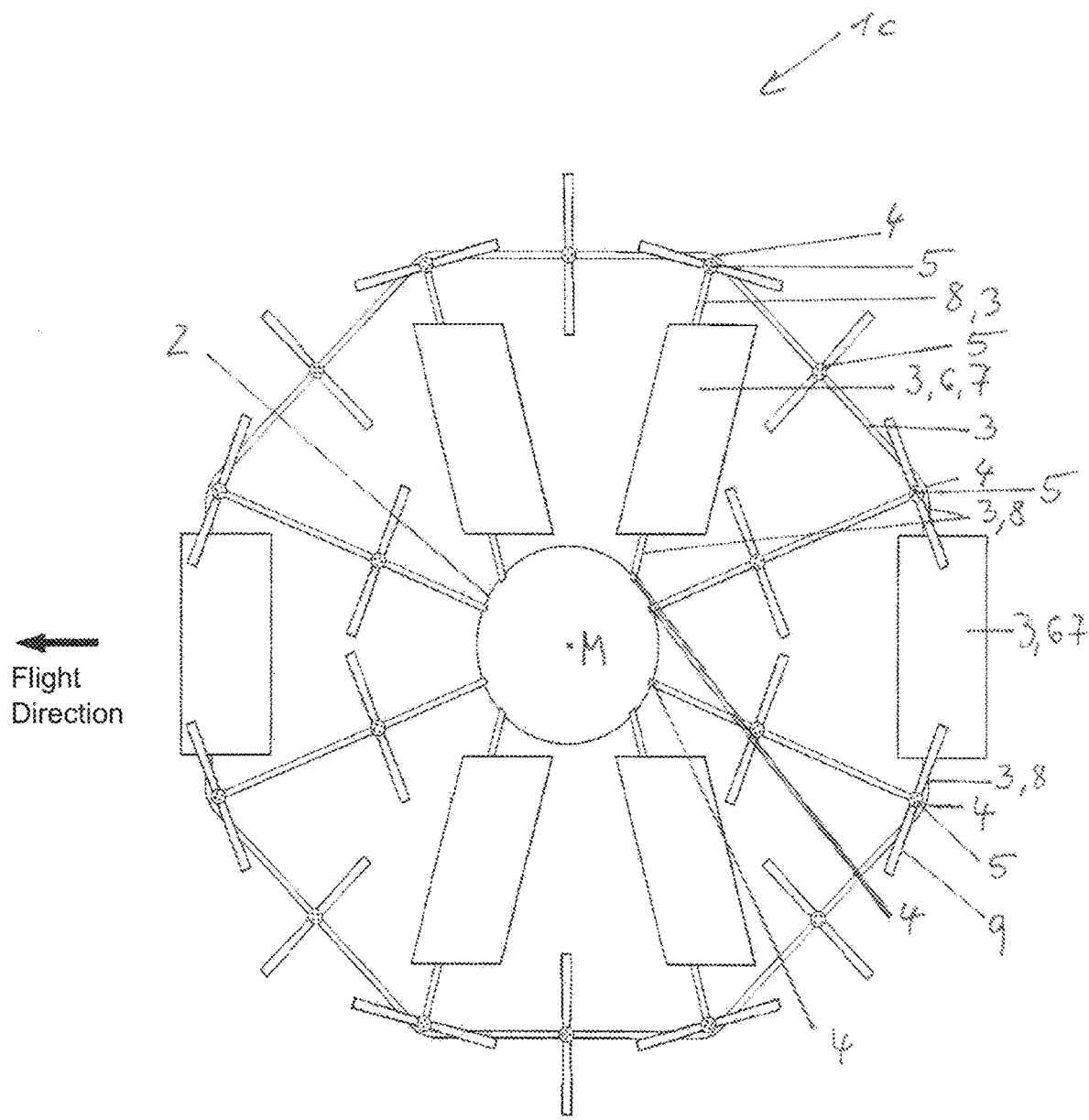
Figure 1D:
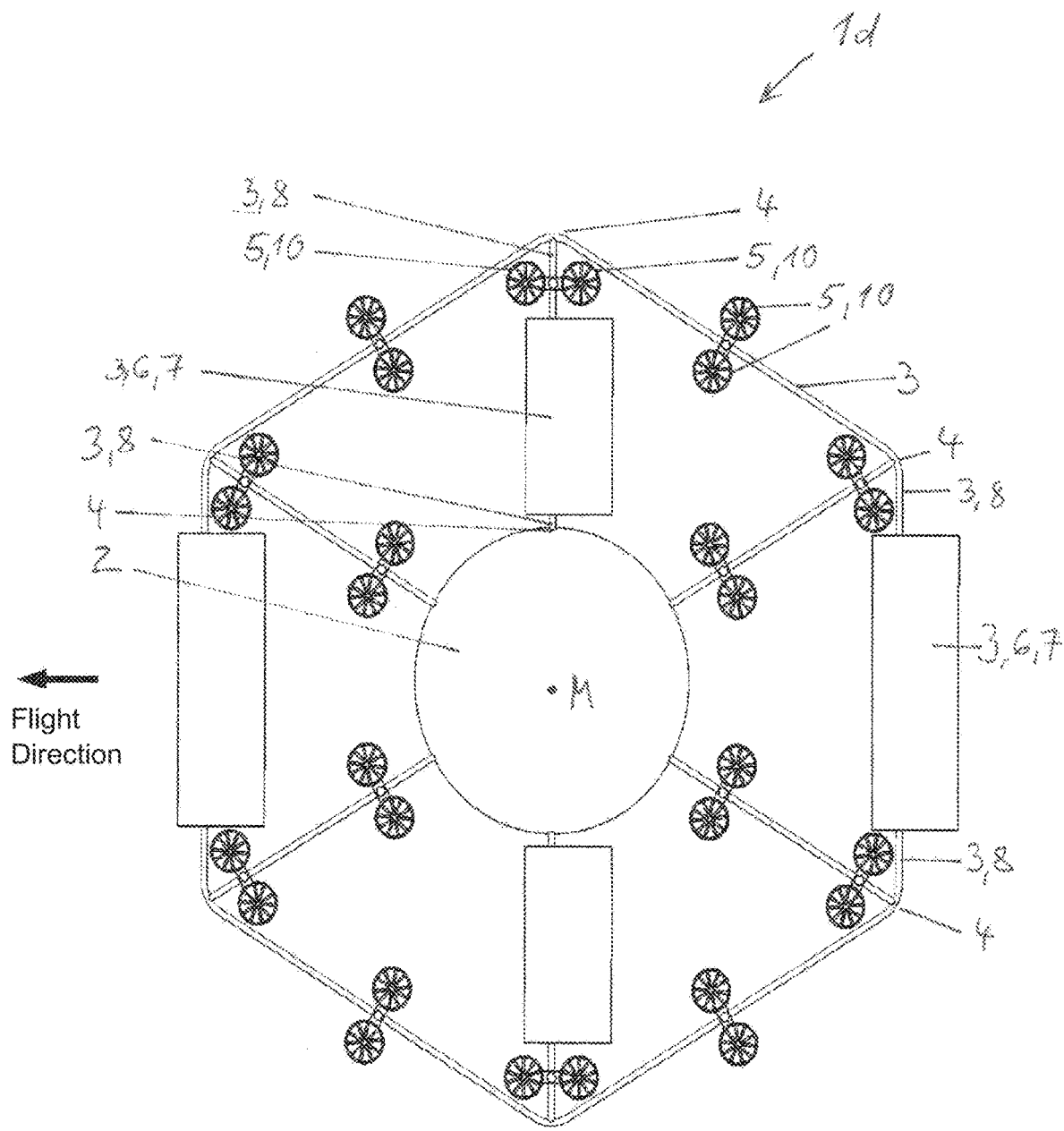
Figure 3A:
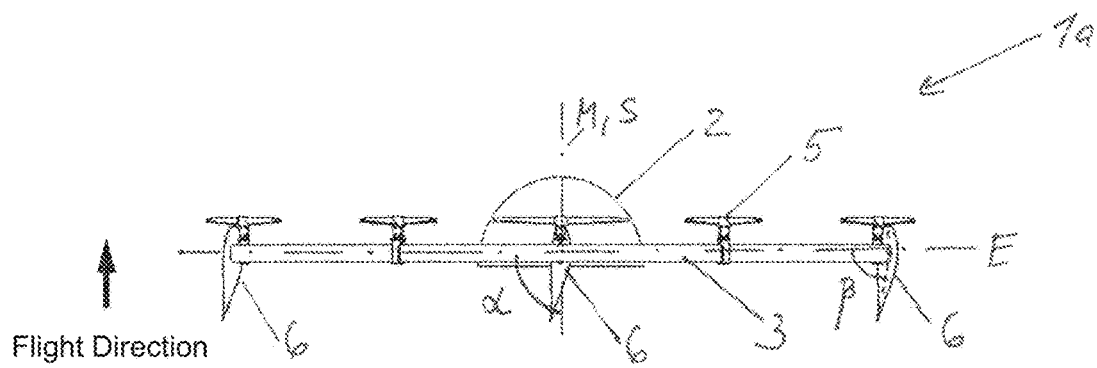
Figure 3B:
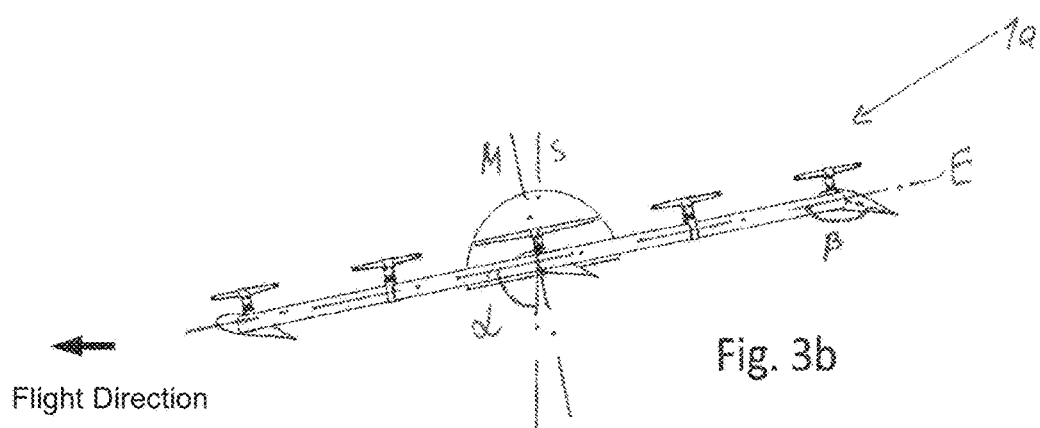
Figure 3C:
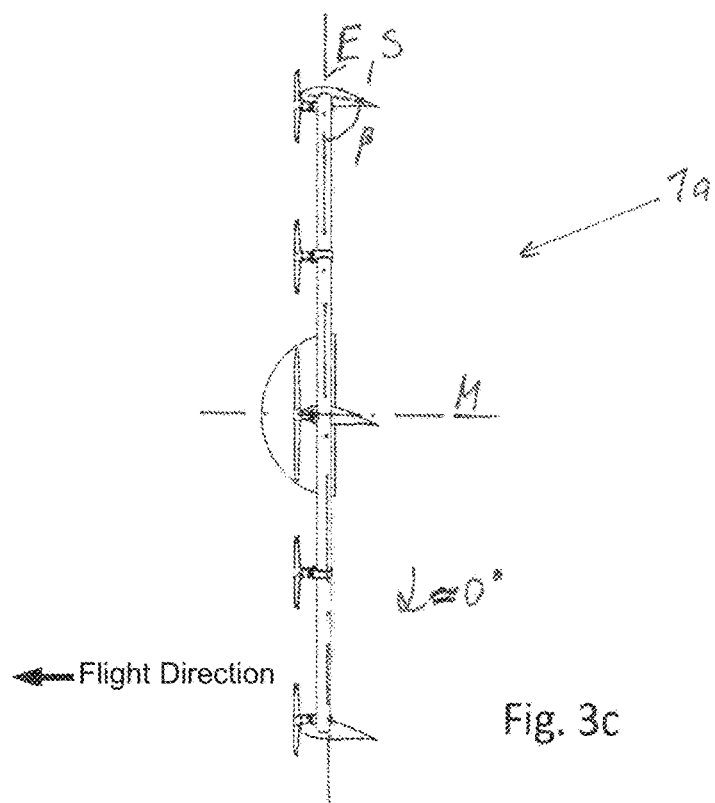
Figure 4A:
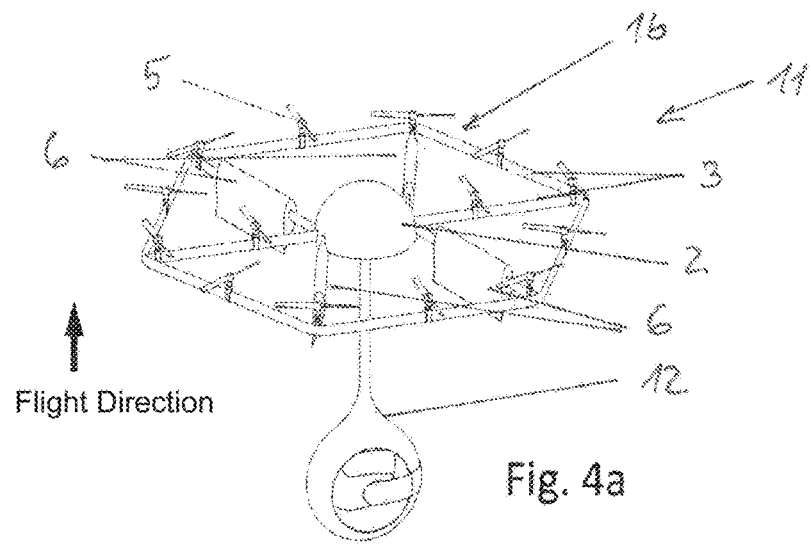

| | |
|---|---|
| FIG. 1a | Plan view of a flight unit according to the invention in a first embodiment with four wings and 14 propeller drive units, |
| FIG. 1b | Plan view of a flight unit according to the invention in a second embodiment with four wings and 14 propeller drive units, |
| FIG. 1c | Plan view of a flight unit according to the invention in a third embodiment with six wings and 18 propeller drive units, |
| FIG. 1d | Plan view of a flight unit according to the invention in a fourth embodiment with four wings and 14 drive units each with two impellers, |
| FIG. 2a | Isometric representation of the flight unit in accordance with FIG. 1a in a climbing phase (lifting), |
| FIG. 2b | Isometric representation of the flight unit in accordance with FIG. 1a in a tilt-up or tilt-down phase, |
| FIG. 2c | Isometric representation of the flight unit in accordance with FIG. 1a in a forward flight phase, |
| FIG. 3a | Side view of the flight unit in accordance with FIG. 2a, |
| FIG. 3b | Side view of the flight unit in accordance with FIG. 2b, |
| FIG. 3c | Side view of the flight unit in accordance with FIG. 2c, |
| FIG. 4a | Isometric representation of an aircraft with the flight unit in accordance with FIG. 1b and a transport unit during the take-off of the aircraft in a climbing phase for the flight unit (lifting), |

-continued

Figure 4B:
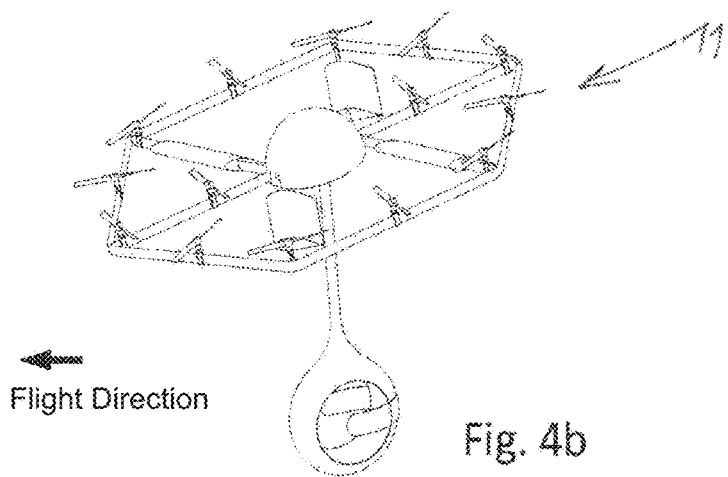
Figure 4C:
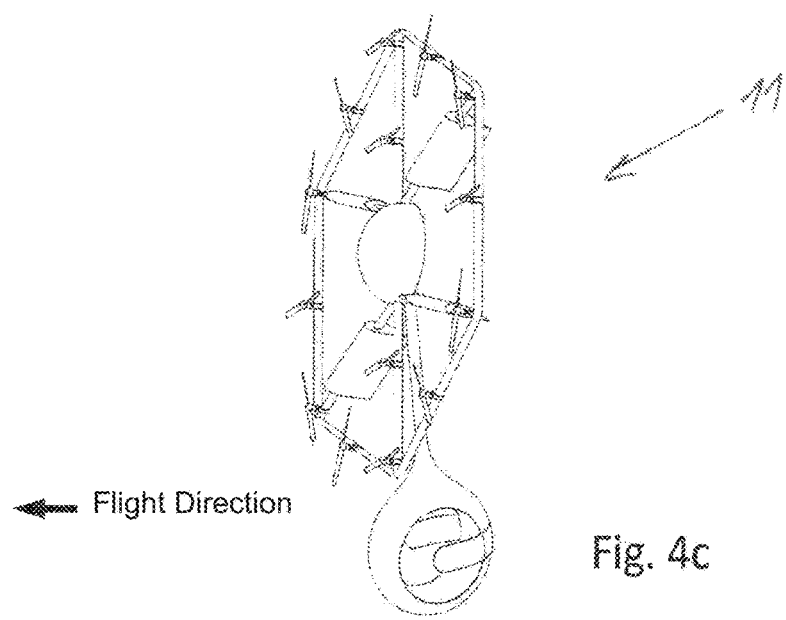
Figure 5A:
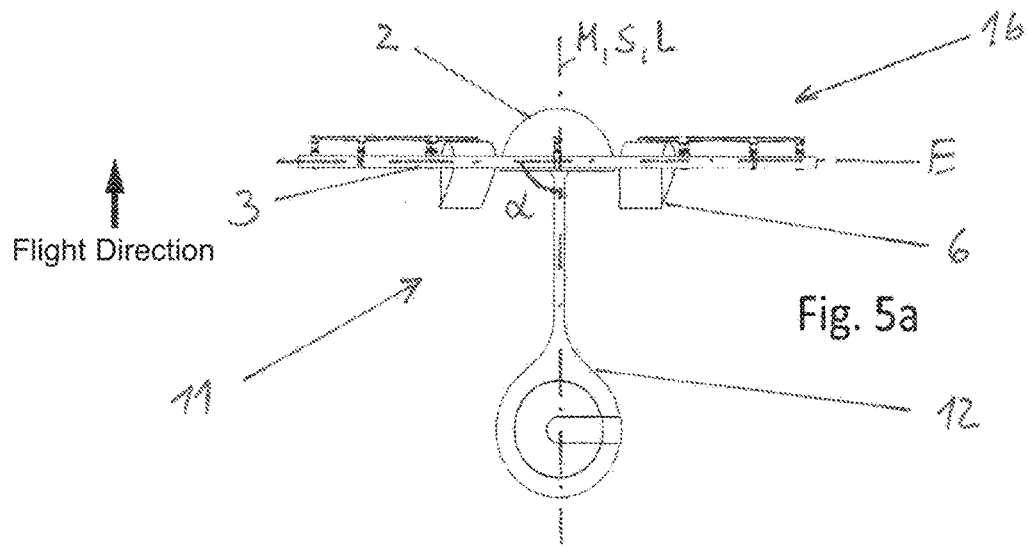
Figure 5B:
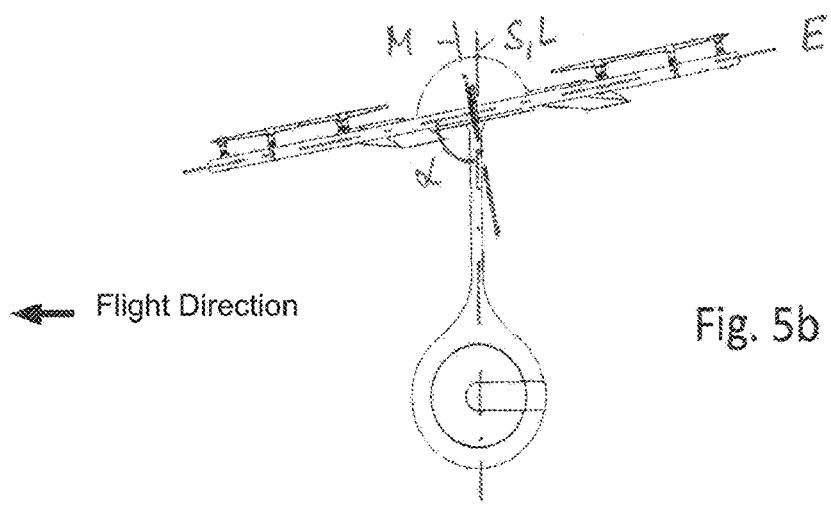
Figure 5C:
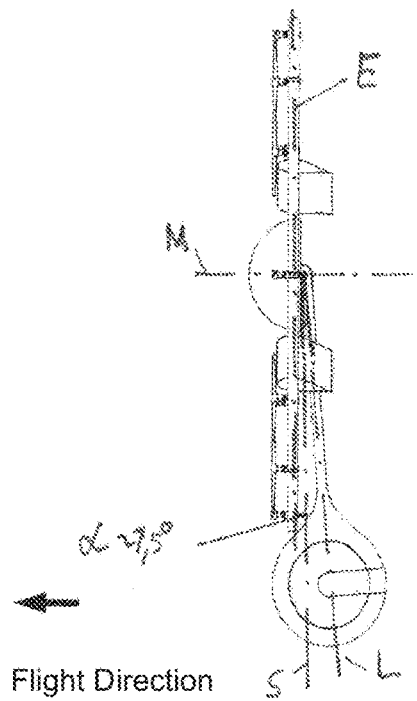
Figure 6A:
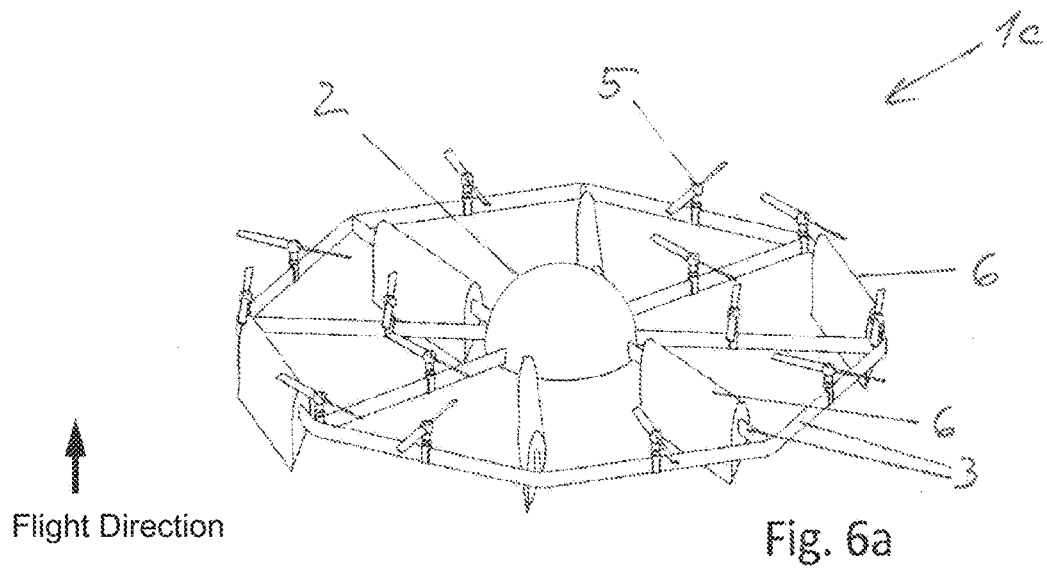
Figure 7A:
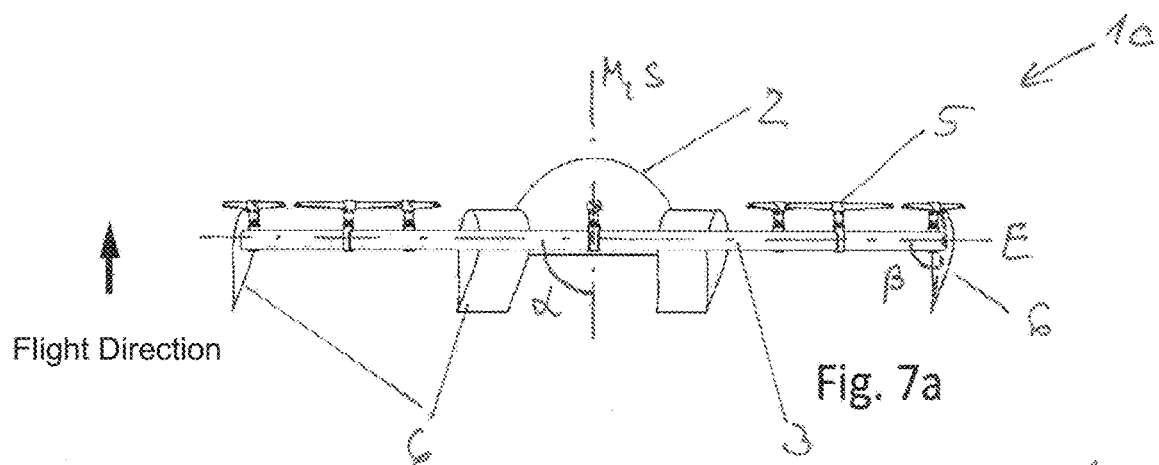
Figure 8A:
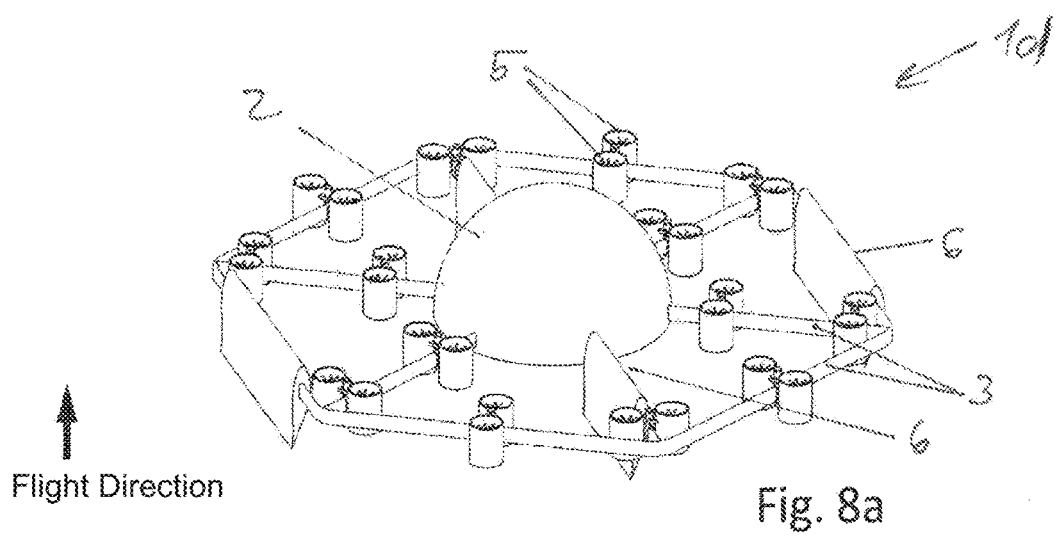
Figure 9A:
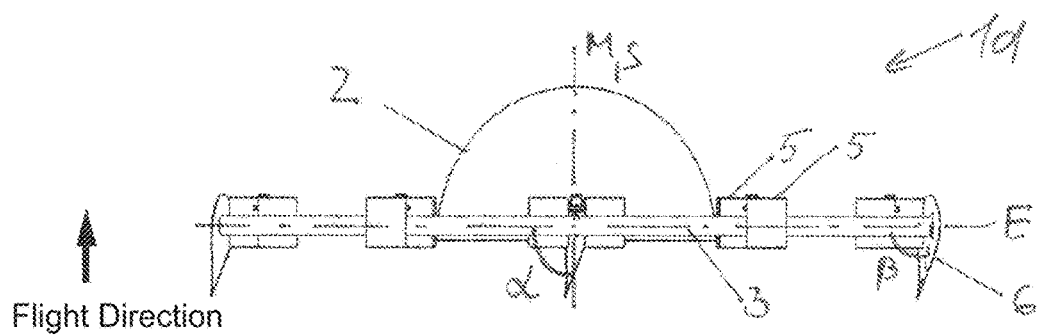
Figure 10A:
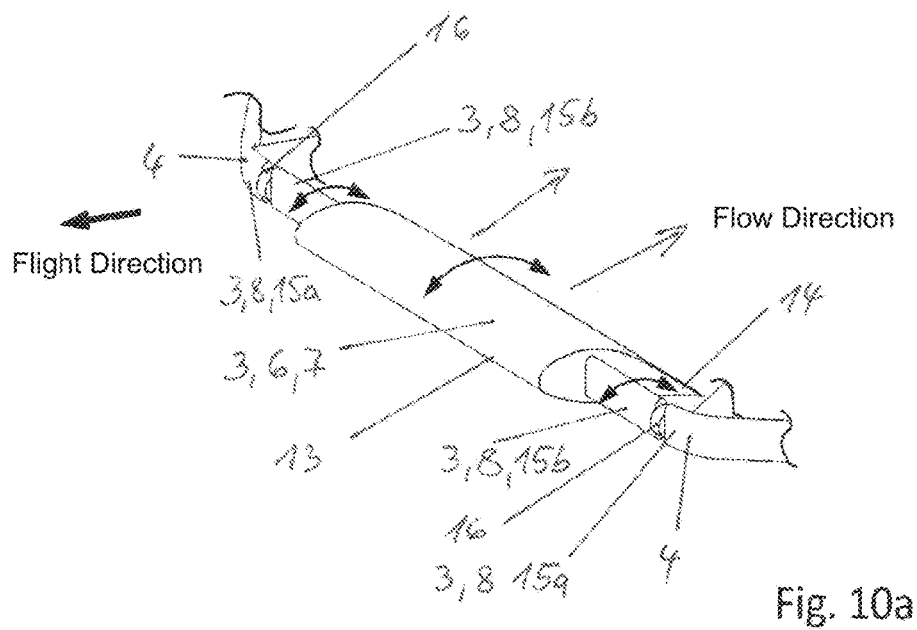
Figure 10B:
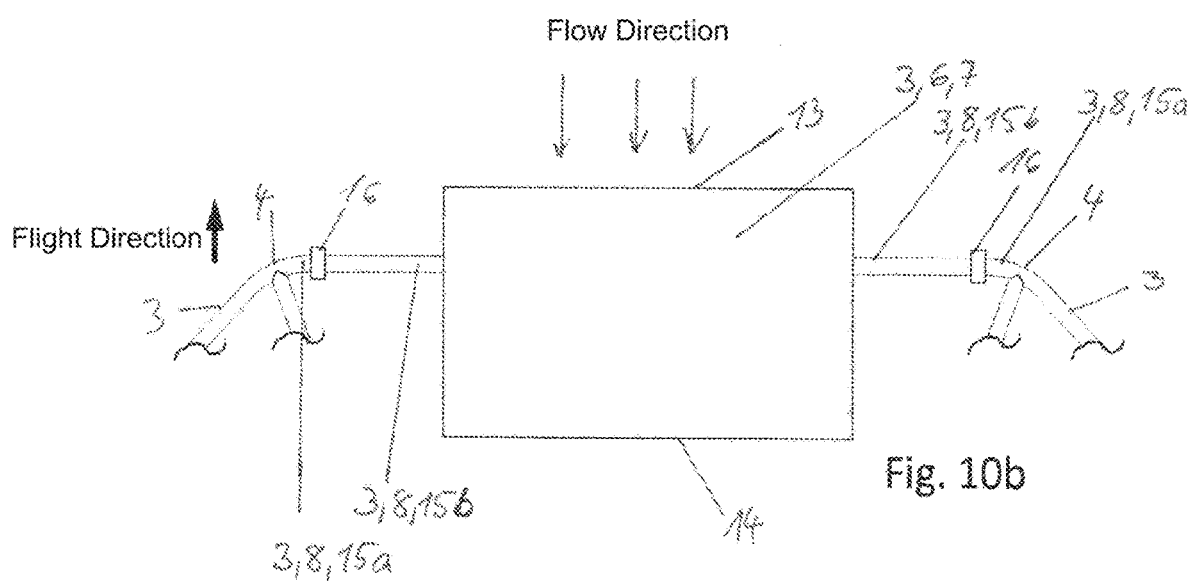
Figure 11A:
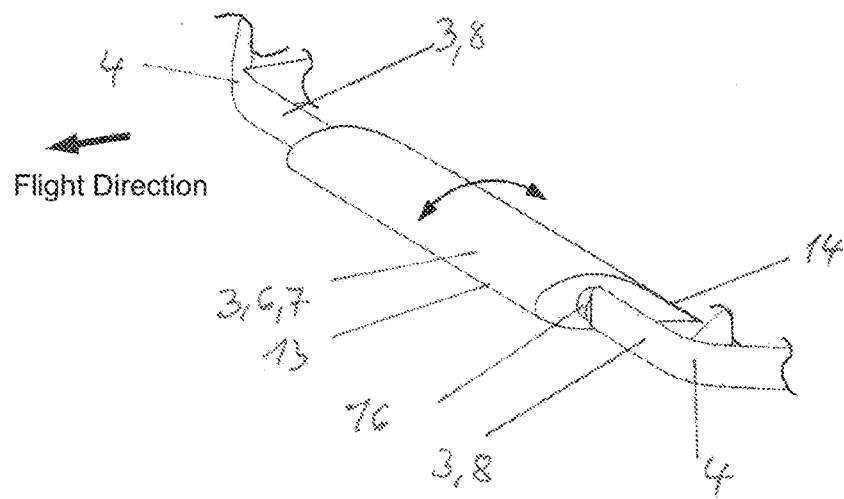
Figure 11B:
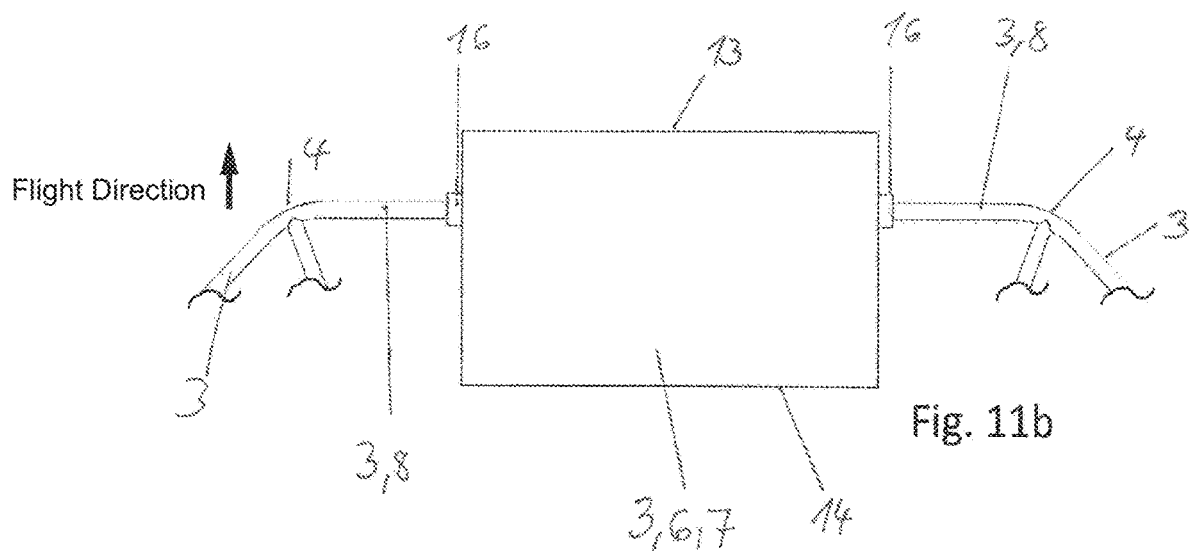
Figure 12A:
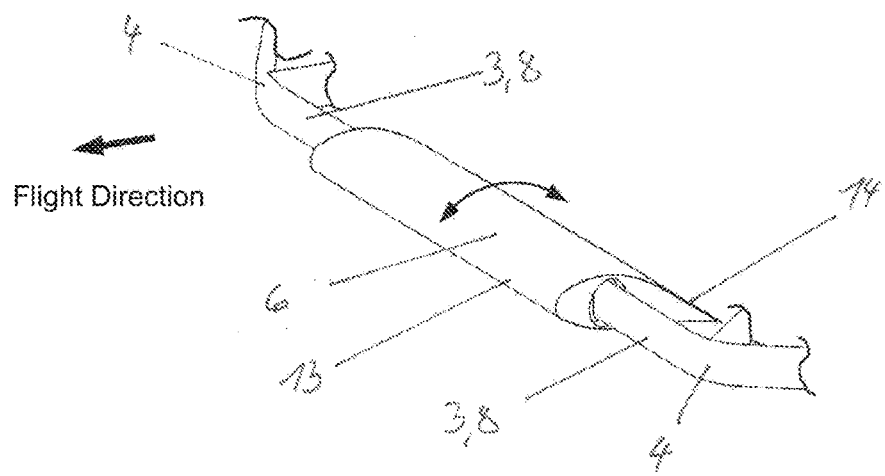
Figure 12B:
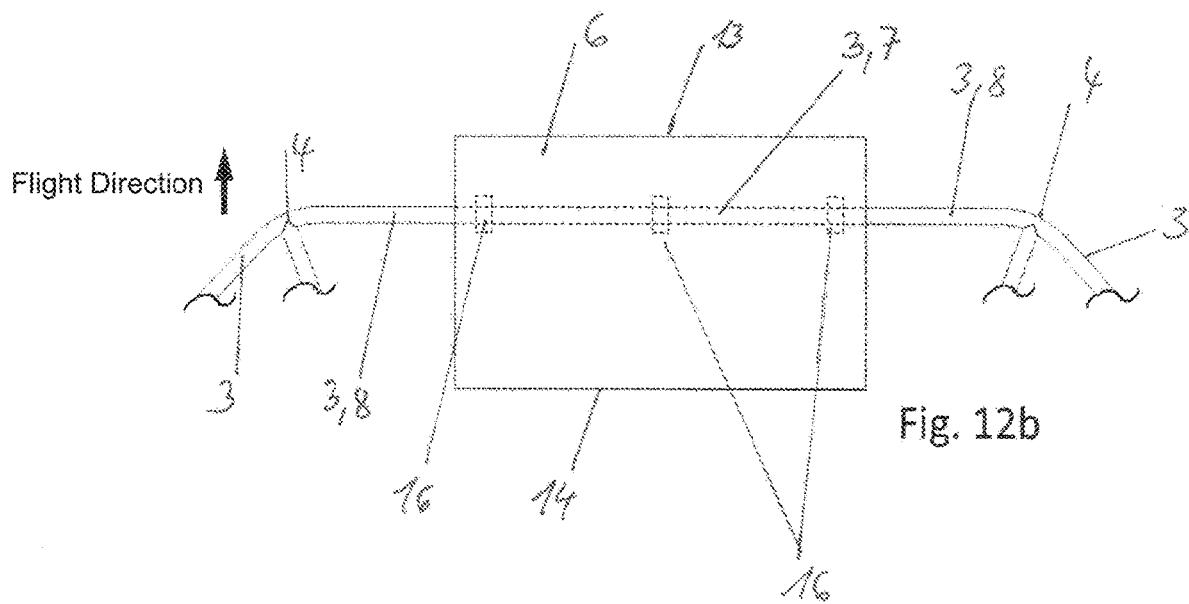

| FIG. 4b | Isometric representation of the aircraft in accordance with FIG. 4a showing the flight unit in a tilt-up phase, |
| --- | --- |
| FIG. 4c | Isometric representation of the aircraft in accordance with FIG. 4a while the aircraft is cruising and with the flight unit in a forward flight phase, |
| FIG. 5a | Side view of the aircraft in accordance with FIG. 4a, |
| FIG. 5b | Side view of the aircraft in accordance with FIG. 4b, |
| FIG. 5c | Side view of the aircraft in accordance with FIG. 4c, |
| FIG. 6a, b, c | Isometric representation of the aircraft in accordance with FIG. 1c in a climbing phase (lifting), in a tilt-up or tilt-down phase and in a forward flight phase, |
| FIG. 7a, b, c | Side view of the flight unit in accordance with FIG. 6a, b, c, |
| FIG. 8a, b, c | Isometric representation of the flight unit in accordance with FIG. 1d in a climbing phase (lifting), in a tilt-up or tilt-down phase and in a forward flight phase, |
| FIG. 9a, b, c | Side view of the flight unit in accordance with FIG. 8a, b, c |
| FIG. 10a | Detailed isometric representation of a wing assembly strut with a wing and with rotary bearings arranged on both sides of the wing assembly strut, |
| FIG. 10b | Plan view of detailed representation in accordance with FIG. 10a, |
| FIG. 11a | Detailed isometric representation of a wing assembly strut with a wing and with rotary bearings arranged on and in contact with both sides of the wing, |
| FIG. 11b | Plan view of detailed representation in accordance with FIG. 11a, |
| FIG. 12a | Detailed isometric representation of a wing with three integrated rotary bearings, |
| FIG. 12b | Plan view of detailed representation in accordance with FIG. 12a. |

In the examples explained below, reference is made to the accompanying drawings, which form part of the examples and in which specific embodiments in which the invention can be put into practice, shown here for illustrative purposes.

In this respect, directional terminology such as 'top', 'bottom', 'front', 'back', 'forward', 'rear' etc. is used with reference to the orientation of the described figures. Since components of embodiments can be positioned in a number of different orientations, the directional terminology is used for illustrative purposes and is in no way restrictive.

It is to be understood that other embodiments can be used and structural or logical changes made without departing from the protective scope of the present invention.

It is further to be understood that the characteristics of the various embodiments described herein can be combined with each other unless specified to the contrary. The following detailed description is therefore not to be understood in a restrictive sense, and the protective scope of the present invention is defined by the appended claims.

Identical or similar elements are assigned identical reference symbols in the drawings where appropriate.

DETAILED DESCRIPTION OF EMBODIMENTS OF THE INVENTION

The node points of the wing assembly include the node points of the interconnected wing assembly struts as well as the node points at which the wing assembly struts are connected to the central unit.

The drive units are arranged at the node points of the interconnected wing assembly struts and/or in a longitudinal section of a few of the wing assembly struts, each one of which has a propeller.

The twelve wing assembly struts form the wing assembly of the flight unit, wherein some—six in the typical embodiment—outer wing assembly struts form the outer, polygon-shaped boundary of the wing assembly and a few—six in the typical embodiment—inner wing assembly struts form the inner, star-shaped wing assembly.

In the star-shaped design of inner wing assembly, the imaginary geometrical extensions of the inner wing assembly struts extend together and radially from the central axis M of the flight unit or from the coinciding central axis of the central unit.

Four of the twelve wing assembly struts each has a wing with an aerofoil shape, which is longitudinally extended in the direction of the respective longitudinally extended wing assembly strut, with two of those wings being longitudinally extended on an outer wing assembly strut and the other two wings being longitudinally extended on an inner wing assembly strut.

Each wing is arranged or configured with the ability to rotate within a defined longitudinal section of the respective wing assembly strut (wing section) relative to the wing assembly struts.

In addition to the wing section, the respective wing assembly strut has two further longitudinal sections (support sections) which adjoin the wing section on both sides and hold the wing alongside the wing assembly strut and within the wing assembly.

The wings are distributed within the wing assembly at different wing assembly struts in such a way that the pair of wings associated with the outer wing assembly struts and the pair of wings associated with the inner wing assembly struts are symmetrically opposite to one another as viewed from the central axis M of the flight unit.

In the intended direction of flight of the flight unit in a forward flight phase (shown as an arrow with the designation "direction of flight"), the flight unit can be aligned in such a way that all wings are arranged in their longitudinally extended form essentially at right angles to the direction of flight, whereby, viewed in the direction of flight, the individual wings of the pair of wings associated with the outer wing assembly struts are positioned one behind the other and the individual wings of the pair of wings associated with the inner wing assembly struts are positioned beside one another.

FIG. 1b illustrates a flight unit in accordance with this invention in a second embodiment with a central unit, twelve longitudinally extended wing assembly struts, each of which extends between two node points of the wing assembly and, when interconnected, form the wing assembly, as well as fourteen drive units.

The node points of the wing assembly include the node points of the interconnected wing assembly struts as well as the node points formed by the connection between the wing assembly struts and the central unit.

The drive units are arranged close to the node points of the interconnected wing assembly struts and/or in a longitudinal section of a few of the wing assembly struts, each one of which has a propeller.

The twelve wing assembly struts form the wing assembly of the flight unit, wherein a few—six in the typical embodiment—outer wing assembly struts form the outer, polygon-shaped boundary of the wing assembly while a few—six in the typical embodiment—inner wing assembly struts form the inner, star-shaped wing assembly.

In the beam-shaped design of the inner wing assembly, the geometrically imaginary extensions of three inner wing assembly struts each start from an imaginary point on the central unit located outside the central axis M of the flight unit (not shown). The two imaginary points on the central unit are arranged on a line that passes through the central axis M of the flight unit and they are arranged symmetrically opposed to one another.

In accordance with this invention, four inner wing assembly struts on the inner wing assembly, specifically in each case the more longitudinally extended one, symmetrically arranged opposite the wing assembly struts on the beam-shaped wing assembly, each features a longitudinally extended embodiment and arrangement of a wing.

In turn, each wing is arranged or configured within a defined longitudinal section of the respective wing assembly strut (wing section) and with the ability to rotate relative to the wing assembly struts.

In addition to the wing section, the respective wing assembly strut has two further longitudinal sections (support sections) which adjoin the wing section on both sides and hold the wing alongside the wing assembly strut and within the wing assembly.

In the intended direction of flight of the flight unit in a forward flight phase (shown as an arrow with the designation "Flight Direction"), the flight unit can be aligned in such a way that all wings, when arranged in their longitudinally extended form are essentially almost at right angles to the direction of flight, wherein, viewed in the direction of flight, the wings are positioned in pairs behind one another and in pairs beside one another.

FIG. 1c illustrates a flight unit in accordance with this invention in a third embodiment with a central unit, 16 interconnected, longitudinally extended wing assembly struts and 18 drive units.

The node points on the wing assembly are formed by the interconnected wing assembly struts and by the wing assembly struts connected to the central unit.

The drive units are arranged at the node points of the interconnected wing assembly struts and/or in a longitudinal section of a few of the wing assembly struts, each one of which has a propeller.

The 16 wing assembly struts form the wing assembly on the flight unit, although a few—eight in the typical embodiment—externally located wing assembly struts form the outer polygon-shaped perimeter of the wing assembly and a few—eight in the typical embodiment—internally located wing assembly struts form the inner wing assembly, a combination of star and beam-shaped design.

With the combined star and beam-shaped design of the inner wing assembly, the imaginary geometrical extensions from four of the inner wing assembly struts extend in a star-shaped or radial manner from central axis M on the flight unit and the imaginary geometrical extensions of the other four inner wing assembly struts extend outwards in pairs in a beam-shaped manner, each from an imaginary point on the central unit that is located away from the central axis M of the flight unit (not shown). The two imaginary points situated away from the flight unit are arranged on a line that passes through the central axis M of the flight unit and they are arranged symmetrically opposed to one another.

In accordance with this invention, each of six wing assembly struts features a wing that is embodied in a longitudinally extended form in the direction of the relevant longitudinally extended wing assembly strut wherein two of those wings are longitudinally arranged in an extended manner relative to an outer wing assembly strut while each of the other four wings is arranged in a longitudinally extended form relative to an inner wing assembly strut on the beam-shaped design of wing assembly. Alternatively, each of the other four wings can be arranged relative to an inner wing assembly strut in the star-shaped design of wing assembly.

The wings are distributed in such a way that the pair of wings associated with the outer wing assembly struts and the two pairs of wings associated with the inner wing assembly struts are symmetrically opposite to one another as viewed from the central axis M of the flight unit.

In turn, each wing is arranged or configured within a defined longitudinal section of the respective wing assembly strut (wing section) and with the ability to rotate relative to the wing assembly struts.

In addition to the wing section, the respective wing assembly strut has two further longitudinal sections (support sections) which adjoin the wing section on both sides and hold the wing alongside the wing assembly strut and within the wing assembly.

In the intended direction of flight of the flight unit in a forward flight phase (shown as an arrow with the designation "Flight Direction"), the flight unit can be aligned in such a way that the two wings on the outer wing assembly struts are arranged broadly at right angles to the direction of flight when they are longitudinally extended while the four wings on the internal wing assembly struts are broadly arranged at right angles to the direction of flight when they are longitudinally extended.

In this direction of flight, the wings on the pair of wings associated with the outer wing assembly struts are positioned behind one another while one pair of the wings associated with the inner wing assembly struts has the wings positioned behind one another and while the other pair has the wings positioned beside one another.

FIG. 1d illustrates a flight unit in accordance with this invention in a fourth embodiment with a central unit, twelve interconnected, longitudinally extended wing assembly struts and 28 drive units.

The node points on the wing assembly are formed by the interconnected wing assembly struts and by the wing assembly struts connected to the central unit.

The drive units are arranged in pairs close to the node points of the interconnected wing assembly struts and/or in pairs on a longitudinal section of a few wing assembly struts and each has a turbine-propeller (known as an impeller) wherein each propeller is arranged in a cylindrically shaped flow tube.

These impellers have a substantially smaller diameter than the diameters of propellers in the drive units in accordance with FIGS. 1a to 1c which means that a much greater number of drive units can be arranged on the wing assembly compared to the embodiments in accordance with FIGS. 1a to 1c and also that the support structure and therefore the entire circumferential dimension of the flight unit can be reduced.

The flight unit in FIG. 1d is illustrated in magnified form compared to the flight unit in accordance with FIG. 1a, b, c. This enlarged view means that, in comparison, the central unit illustrated in FIG. 1d appears to be bigger.

However, the central unit in FIG. 1d is the same size as the central unit in accordance with FIG. 1a, b, c although the circumference of the support structure in FIG. 1d is smaller than the circumference of the support structure provided for in accordance with FIG. 1a, b, c.

Alternatively, a flight unit can be designed using a smaller impeller that can then provide more space for the arrangement of wings (not shown).

The twelve wing assembly struts form the wing assembly of the flight unit, wherein some—six in the typical embodiment—outer wing assembly struts form the outer, polygon-shaped boundary of the wing assembly and a few—six in the typical embodiment—inner wing assembly struts form the inner, star-shaped wing assembly.

In the star-shaped design of inner wing assembly, the imaginary geometric extensions of the inner wing assembly struts extend together, radially from the central axis M of the flight unit.

Four of the twelve wing assembly struts each has a wing which is longitudinally extended in the direction of the respective longitudinally extended wing assembly strut, with two of those wings being longitudinally extended on an outer wing assembly strut and the other two wings being longitudinally extended on an inner wing assembly strut.

In turn, each wing is arranged or configured within a defined longitudinal section of the respective wing assembly strut (wing section) and with the ability to rotate relative to the wing assembly struts.

In addition to the wing section, the respective wing assembly strut has two further longitudinal sections (support sections) which adjoin the wing section on both sides and hold the wing alongside the wing assembly strut and within the wing assembly.

The wings are distributed in such a way that the pair of wings associated with the outer wing assembly struts and the pair of wings associated with the inner wing assembly struts are symmetrically opposite to one another as viewed from the central axis M of the flight unit.

In the intended direction of flight of the flight unit in a forward flight phase (shown as an arrow with the designation "Flight Direction"), the flight unit can be aligned in such a way that all wings are arranged in their longitudinally extended form essentially at right angles to the direction of flight, whereby, viewed in the direction of flight, the individual wings of the pair of wings associated with the outer wing assembly struts are positioned one behind the other and the individual wings of the pair of wings associated with the inner wing assembly struts are positioned beside one another.

FIGS. 2a to 2c and 3a to 3c show the flight unit in accordance with FIG. 1a in various flight phases.

In the various flight phases, the rotatable wings are controlled individually or jointly with a variably adjustable angle of approach β, which is enclosed between a wing assembly plane E formed by the wing assembly of the flight unit and a central cross-sectional plane of the wing, and individually adjusted according to the requirements of the respective flight conditions.

The angle of approach β can be further adjusted depending on the angle of inclination α of the flight unit relative to the line of gravity S of the flight unit, or the wing positions in a certain angle of approach β and the setting of the propellers of the drive units influence the inclination of the flight unit and therefore also the angle of inclination α.

FIGS. 2a, 3a show the flight unit in accordance with FIG. 1a in a climbing phase (lifting).

In this flight phase, the flight unit is primarily in a horizontally aligned flight attitude in relation to the ground.

The angle of inclination α of the flight unit that extends between the wing assembly plane E and the perpendicular line of centre of gravity S of the flight unit measures about 90°.

In this flight phase, as shown, the wings with rotational movement capability, e.g., individually or together, are preferably set with an angle of approach β of about 90°.

In a descent phase not shown here, equivalent positions of the angle of inclination α of the flight unit and the angle of approach β of the wings are provided.

Alternatively, in a descent phase the angle of approach β can be set to about 270° (not shown).

The position of the wings facilitates lift during the climb phase (or also in the descent phase) and stabilises the flight attitude of the flight unit, which is essentially horizontal in relation to the ground, e.g., opposing the effects of crosswinds.

In special situations such as, by way of example, unfavourable headwinds or tailwinds during the climb phase, the wings can be set individually or together to an angle of approach β of about 270°, preferably to an angle of approach β of 180° to help the flight unit to decelerate when necessary (not shown).

FIGS. 2b, 3b show the flight unit in accordance with FIG. 1a in a tilt-up or tilt-down phase.

In this flight phase, the flight unit is primarily in an inclined flight attitude in relation to the ground.

The angle of inclination α of the flight unit is in one area less than 90° and greater than 0°.

In this flight phase, as shown, the wings with rotational movement capability, e.g., individually or together, are preferably set with an angle of approach β of about 90° to about 180°.

The position of the wings in this area supports the upward and downward inclination of the flight unit while also stabilising the flight unit in this flight attitude of the transition from a horizontally directed flight attitude to an almost vertically directed flight attitude of the flight unit and vice versa.

By way of example, FIG. 3b shows an angle of approach β for all wings of about 155°.

FIGS. 2c, 3c show the flight unit in accordance with FIG. 1a in a forward flight phase also called the cruising phase.

In this flight phase, the flight unit is primarily in an almost vertically aligned flight attitude in relation to the ground.

The angle of inclination α of the flight unit is about 0° or is close to 0°.

In this flight phase the wings with rotational movement capability are preferably set to an angle of approach β within a range of roughly 45° to 135° in order to generate optimum airflow around, and corresponding lift power to, the wings for the forward flight and to be able to adjust the flight unit in its desired flight attitude and cruising altitude.

By way of example, FIG. 3c shows an angle of approach β for all wings of about 80°.

In certain situations, e.g., with the flight unit involved in a necessary deceleration situation or avoidance situation during straight-ahead or forward flight, one or more wings with an angle of approach β of 0° to 180° can be adjusted (not shown) to slow down or redirect the flight unit.

FIGS. 4a to 4c and 5a to 5c show an aircraft with a flight unit in accordance with FIG. 1b and with a transport unit coupled to the flight unit during various different flight phases.

The transport unit shown has a lockable transport capsule with a longitudinally extended shaft, wherein the shaft is connected to the central unit of the flight unit by means of an articulated coupling.

Objects or persons can be transported in the lockable transport capsule of the transport unit shown.

In the various flight phases of the aircraft, the transport unit is oriented essentially perpendicular to the ground by means of the freely movable articulated coupling.

The longitudinal axis L of the rotationally symmetrical transport unit therefore effectively coincides with the perpendicular force exerted by line of gravity S on the transport unit during the various flight phases of the aircraft.

In the same manner, the vertical line of gravity S of the flight unit is essentially identical to the vertical line of gravity S of the transport unit attached to the flight unit, forming the common line of gravity S of the aircraft.

FIGS. 4c and 5c show a possible special feature of the orientation of the transport unit in relation to the ground.

Alternatively, in accordance with this invention, other transport units with other connection configurations can be coupled to the flight unit.

In the various flight phases of the aircraft shown here, the wings with rotational movement capability on the flight unit, in accordance with FIG. 1b, can be operated individually or together with a variably adjustable angle of approach β and in accordance with the individual requirements of the prevailing flight conditions of the aircraft.

Furthermore, the angle of approach β can be adjusted depending on the angle of inclination α of the flight unit in accordance with FIG. 1b in relation to the line of gravity S of the flight unit or the aircraft, or the wing positions in a certain angle of approach β and the setting of the propellers in the drive units can influence the inclination of the flight unit in accordance with FIG. 1b and therefore also the angle of inclination α.

The procedures and settings relating to the flight unit 1b in the different flight phases are comparable to the procedures and settings relating to the flight unit in accordance with FIG. 1a in the different flight phases described above. Consequently, the following section makes reference to the embodiments of FIGS. 2a to 2c and 3a to 3c regarding the description of the flight unit.

FIGS. 4a, 5a show the aircraft in a climbing phase (lifting).

In this flight phase, the flight unit is primarily in a horizontally aligned flight attitude in relation to the ground. In contrast, the transport unit with its longitudinal axis L is primarily oriented perpendicular to the ground.

The angle of inclination α of the flight unit that extends between the wing assembly plane E and the perpendicular line of centre of gravity S of the flight unit and/or the aircraft measures about 90°.

With reference to the description of the flight unit in this flight phase, the ensuing text makes reference to the embodiments shown in FIGS. 2a, 3a.

In a descent phase that is not shown, corresponding positions of the angle of inclination α of the flight unit and the angle of attack β of the wings are provided.

FIGS. 4b, 5b show the aircraft in a tilt-up or tilt-down phase.

In this flight phase, the flight unit is primarily in an inclined flight attitude in relation to the ground whereas the transport unit with its longitudinal axis L is primarily oriented perpendicular to the ground, also during this flight phase.

The angle of inclination α of the flight unit is in one area less than 90° and greater than 0°.

In relation to the description of the flight unit in this flight phase, the ensuing text makes reference to the embodiments shown in FIGS. 2b, 3b.

FIGS. 4c, 5c show the aircraft in a forward flight phase also referred to as the cruising phase.

In this flight phase, the flight unit is essentially in an almost vertically aligned flight attitude with respect to the ground, but without colliding with the transport unit, which is oriented with its longitudinal axis L in this flight phase essentially vertically or almost vertically with respect to the ground.

In other words, the shaft of the transport unit is so narrow and longitudinally extended that in this flight phase the flight unit, which is inclined downwards towards the ground, and in particular the wings of the flight unit, are not obstructed by the body of the transport unit.

In addition, at the desired higher flight speed of the aircraft in the cruising phase, as shown, a resulting slight inclination of the transport unit can occur, relative to its longitudinal axis L, to its line of gravity S and therefore also relative to the ground. This results from the vector of the perpendicular action of gravity on the transport unit as well as the action of wind force on the transport unit.

This physical effect also prevents a collision between the flight unit and the transport unit.

In this typical embodiment the angle of inclination α of the flight unit measures about 1.5°.

In relation to the description of the flight unit in this flight phase, the ensuing text makes reference to the embodiments shown in FIGS. 2c, 3c.

FIGS. 6a to 6c and 7a to 7c show the flight unit in accordance with FIG. 1c in various flight phases.

In the various flight phases of this flight unit in accordance with FIG. 1c, the wings with rotational movement capability are also controlled individually or together with a variably adjustable angle of approach β and are adjusted individually in accordance with the requirements of prevailing flight conditions.

The angle of approach β can further be adjusted depending on the angle of inclination α of the flight unit in accordance with FIG. 1c relative to the line of gravity S of the flight unit, or the wing positions in a certain angle of approach β and the setting of the propellers of the drive units influence the inclination of the flight unit in accordance with FIG. 1c and therefore also influence angle of inclination α.

FIGS. 6a, 7a show the flight unit in accordance with FIG. 1c in a climbing phase (lifting).

Figure 6B:
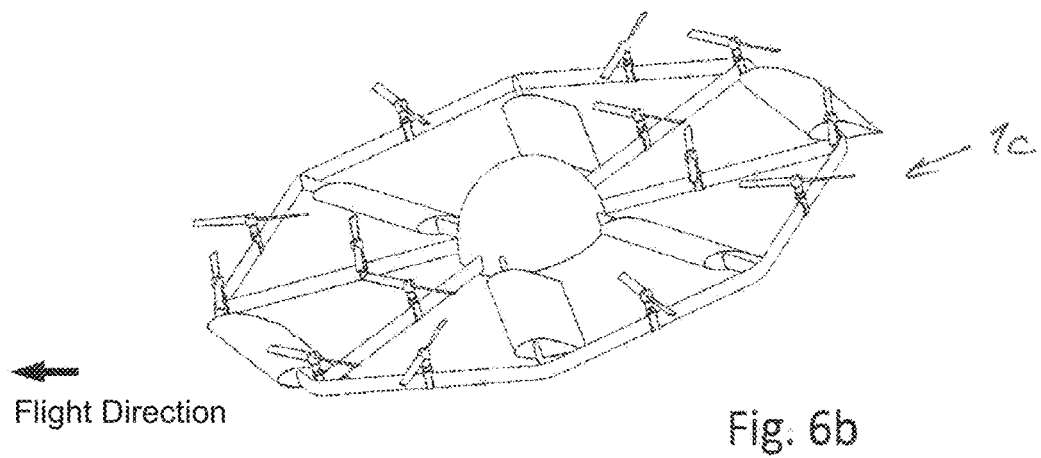
Figure 7B:
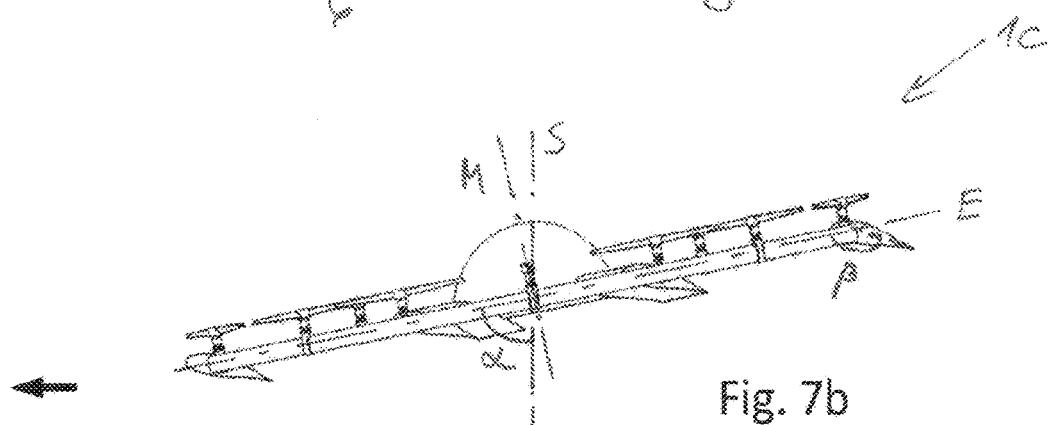

FIGS. 6b, 7b show the flight unit in accordance with FIG. 1c in a tilt-up or tilt-down phase.

Figure 6C:
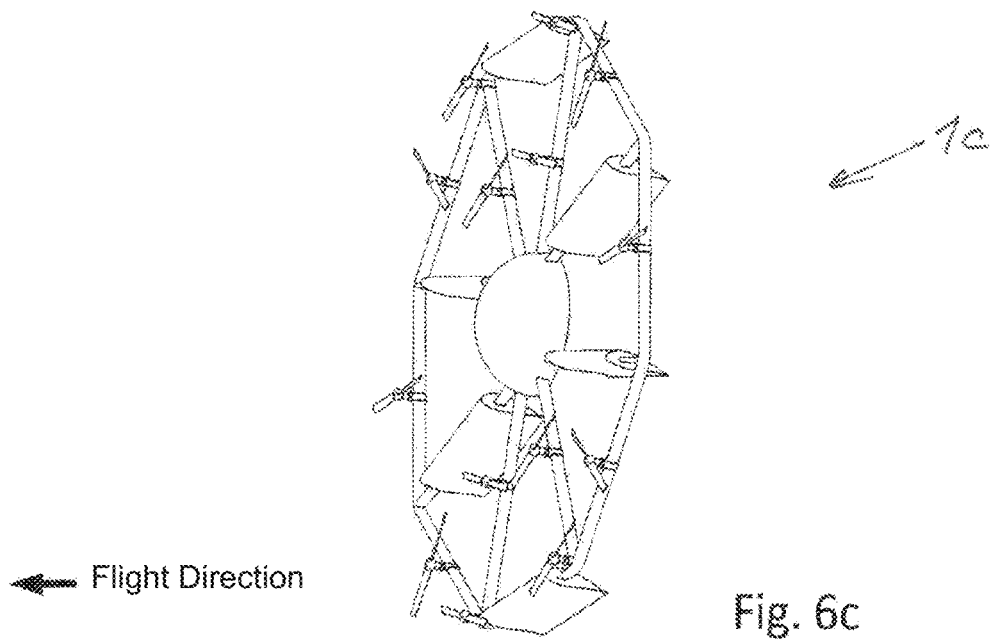
Figure 7C:
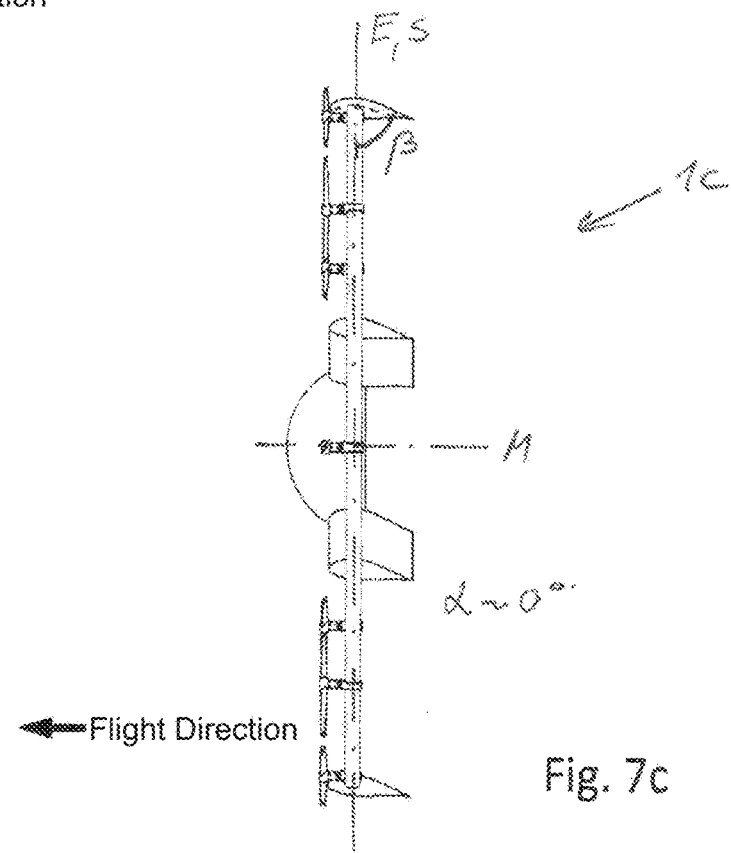

FIGS. 6c, 7c show the flight unit in accordance with FIG. 1c in a forward flight phase.

The procedures and settings relating to the flight unit 1c in the different flight phases are comparable to the procedures and settings relating to the flight unit in accordance with FIG. 1a in the different flight phases described above. Consequently, reference is made to the embodiments of FIGS. 2a to 2c and 3a to 3c regarding the description of the flight unit.

FIGS. 8a to 8c and 9a to 9c show the flight unit in accordance with FIG. 1d in various flight phases.

In the various flight phases of this flight unit in accordance with FIG. 1c, the wings with rotational movement capability are also controlled individually or together with a variably adjustable angle of approach β and are adjusted individually in accordance with the requirements of prevailing flight conditions, even when the influence of the wings on lift power and directional capability of the flight unit are less because of the reduced airflow across the wings from the impellers.

Nevertheless, the angle of approach β can be adjusted in response to the angle of inclination α of the flight unit in accordance with FIG. 1d compared to the line of centre of gravity S of the flight unit. The wing positions in a certain angle of approach β and the setting of the impellers of the drive units nevertheless influence the inclination of the flight unit in accordance with FIG. 1d and therefore also affect the angle of inclination α.

FIGS. 8a, 9a show the flight unit in accordance with FIG. 1d in a climbing phase (lifting).

Figure 8B:
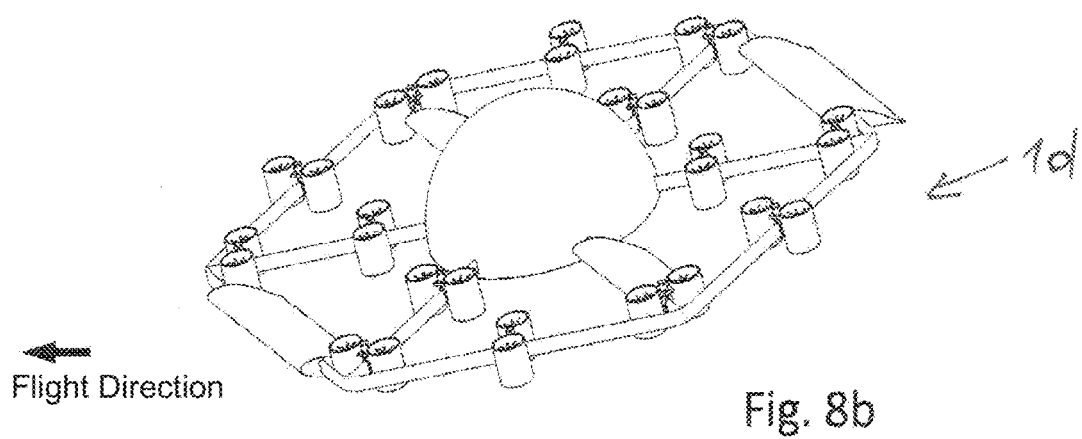
Figure 9B:
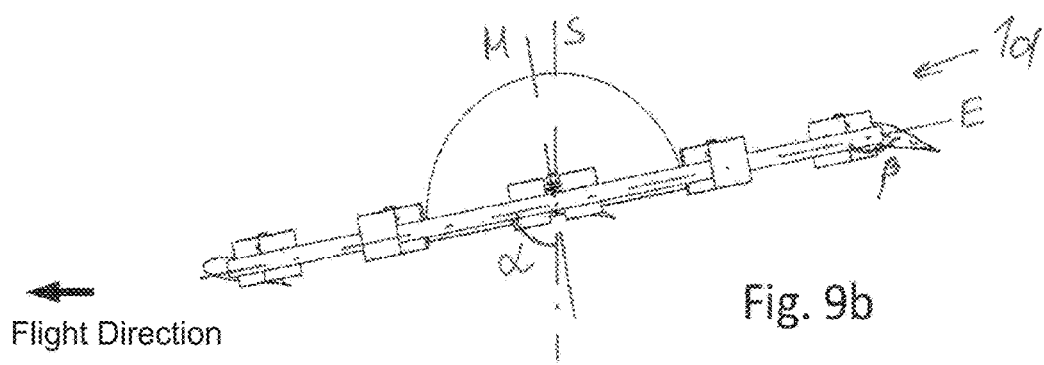

FIGS. 8b, 9b show the flight unit in accordance with FIG. 1d in a tilt-up or tilt-down phase.

Figure 8C:
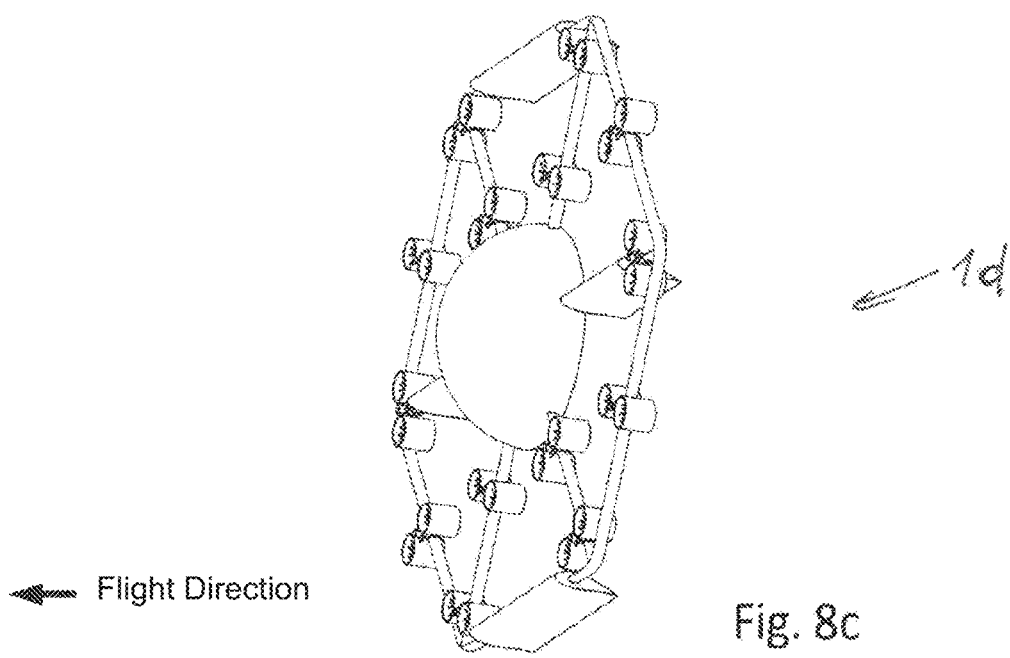
Figure 9C:
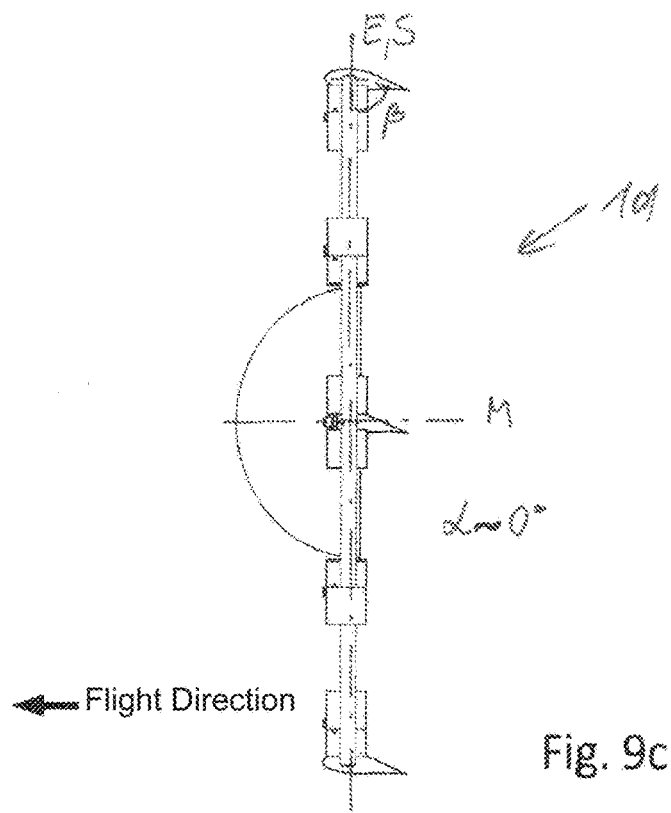

FIGS. 8c, 9c show the flight unit in accordance with FIG. 1d in a forward flight phase.

The procedures and settings relating to the flight unit 1d in the different flight phases are comparable to the procedures and settings relating to the flight unit in accordance with FIG. 1a in the different flight phases described above. Consequently, reference is made to the embodiments of FIGS. 2a to 2c and 3a to 3c regarding the description of the flight unit.

FIGS. 10a, b show in detail a section of a wing assembly strut with a wing arranged on it.

The wing assembly strut extends between two node points on the wing assembly and it has one wing section and two support sections enclosing both sides of the wing section.

Together, the wing section and the two support sections perform the support function for the relevant wing assembly strut inside the wing assembly.

In the wing section, the wing assembly strut is designed as a wing in accordance with this invention, with an aerofoil shape (support surface). This therefore makes the cross-section of the wing much greater than the cross-section of the associated wing assembly strut that features the wing.

The wing section has a rounded leading edge in the front direction of flow for incoming airflow to the wing and a pointed trailing edge in the rear direction of flow for the airflow away from the wing.

This wing section is rigidly connected to both sides of the support section.

The support sections on both sides are subdivided into a longer rotatable part of the support section which directly adjoins the wing section and is rigidly connected to it, and a shorter fixed part of the support section which in a slightly curved form rigidly adjoins the relevant node point of the wing assembly strut.

The rotationally movable part and the fixed-position part of the respective support sections are connected together by a rotary bearing.

This means that the wing formed in the wing section of the wing assembly strut together with the directly attached rotatable parts of the support section can be swivelled around its longitudinal axis relative to the fixed support sections of the wing assembly strut by means of the two rotary bearings, whereby the rotatable parts of the support section function as two rotary shafts supporting and guiding the wing.

The bending load caused by the incoming airflow to the wing causes a slight angular change in the rotatable parts of the support sections connected to the wing in relation to the fixed parts of the respective support sections. This can be compensated for easily, for example through the use of spherical roller bearings that allow a certain degree of angular adjustment in the relative positions of the bearing elements.

FIGS. 11a, 11b show in detail a section of a wing assembly strut in an alternative embodiment with a wing arranged on it.

The wing assembly strut extends in the same way as the embodiment in accordance with FIG. 10a,b which is to say between two node points on the wing assembly and it has one wing section and two support sections enclosing both sides of the wing section.

Together, the wing section and the two support sections perform the support function for the relevant wing assembly strut inside the wing assembly.

The wing in the wing section is arranged with an aerofoil shape (support surface) in the same way as the wing in accordance with FIG. 10a,b.

The wing section and the wing formed by it is connected by two rotary bearings to the rigid support sections of the wing assembly strut arranged on both sides.

The rotary bearings can be arranged on the wing and flush to both sides of the wing or, in another embodiment, can be integrated entirely in the wing.

This means that, in accordance with this typical embodiment, the wing formed in the wing section of the wing assembly strut can be pivoted around the longitudinal axis by means of the two rotary bearings relative to the fixed support sections of the wing assembly strut.

The bending load acting on the fixed support sections as a result of the incoming airflow to the wing causes a slight change in the angle of the respective fixed support sections relative to the wing. This is also easy to compensate for through, by way of example, the use of spherical roller bearings that allow a certain angular position of the bearing elements relative to one another.

This embodiment creates a higher bending load on the fixed support sections compared to the embodiment in accordance with FIG. 10a,b, while also creating a more stable mounting of the wing in all flight positions of the flight unit. Furthermore, this embodiment constitutes a simpler design embodiment for the adjustment capability of the wing relative to the wing assembly struts and it also makes the wings easier to replace when adjusting the aircraft to accommodate application-specific flight profiles.

FIGS. 12a, 12b show in detail a section of a wing assembly strut in an alternative embodiment with a wing arranged on it.

The wing assembly strut extends in the same way as the embodiment in accordance with FIGS. 10a, b and 11a, b which is to say between two node points on the wing assembly and it has one wing section and two support sections enclosing both sides of the wing section.

The wing assembly struts in this embodiment have a continuous beam cross-section of the same size in the wing section as well as in the two support sections. This means that they are designed just like any other wing assembly struts of the wing assembly and they perform the same load-bearing function within the wing assembly.

The wing in the wing section is formed with an aerofoil shape equivalent to the wing in accordance with FIG. 10a,b, 11a,b, whereby the wings in accordance with this typical embodiment enclose the wing assembly strut in the area of the wing section where the wing is arranged.

The wing is connected to the wing section of the wing assembly strut by three rotary bearings that are arranged in the wing section.

Therefore, in accordance with this typical embodiment, the wing formed in the wing section of the wing assembly strut can be pivoted around its longitudinal axis by means of the three rotary bearings in relation to the entire fixed wing assembly struts, with the wing assembly struts acting as a rotational axis that supports and mounts the wing with rotational movement capability.

In this typical embodiment, the bending load acting on the supporting structure beams as a result of the incoming airflow to the wing is distributed as uniformly as possible over the uniformly formed wing assembly strut. This means that only a slight deflection of the wing assembly strut can be expected and that, in broad terms, the distributed rotary bearings do not experience any angular changes.

This embodiment further improves the stability of the wing assembly and the flight characteristics and also makes it possible to use a simpler design of rotary bearing, such as a ball bearing or an anti-friction bearing.

LIST OF REFERENCE SIGNS

1 Flight unit a, b, c, d
2 Central unit
3 Wing assembly strut
4 Node point of wing assembly
5 Drive unit
6 Wing
7 Longitudinal section of wing assembly strut, wing section
8 Longitudinal section of wing assembly strut, support section
9 Propeller
10 Turbine propeller
11 Aircraft
12 Transport unit
13 Leading edge of wing
14 Trailing edge of wing
15 Part of support section a-static b-rotatable
16 Rotary bearing
M Central axis of flight unit
E Plane of wing assembly
S Line of gravity
L Longitudinal axis of transport unit
α Angle of inclination
β Angle of approach

What is claimed is:

1. A flight unit for a vertically take-off and landing aircraft, wherein the flight unit comprises several drive units arranged on a framework structure comprising longitudinally extended framework struts interconnected at fixed node points, wherein at least some of the framework struts comprise at least one wing of an aerofoil shape that is arranged or configured to be rotatable relative to a wing section of the framework strut and/or relative to at least one support section of the framework strut, and wherein a support section of a framework strut is arranged and/or configured to be rotatable relative to another support section of the same framework strut.

2. The flight unit of claim 1, wherein the at least one wing is arranged or configured to be rotatable about a longitudinal axis of the framework strut.

3. The flight unit of claim 1, wherein the at least one wing is arranged or configured to enclose a wing section of the framework strut.

4. The flight unit of claim 1, wherein an angle of approach β of the at least one wing is arranged adjustably across an angle range of from 0° to 270°.

5. The flight unit of claim 1, wherein an adjustment of wings can be controlled individually and/or in groups.

6. The flight unit of claim 1, wherein the at least one wing has a rounded leading edge at its front, viewed in a direction of flow.

7. The flight unit of claim 1, wherein the at least one wing has a tapering trailing edge at its rear, viewed in a direction of flow.

8. The flight unit of claim 1, wherein the at least one wing has an inflow surface on its upper side that is curved relative to an outflow surface on its underside.

9. The flight unit of claim 1, wherein an inflow surface of a top of the at least one wing is convex in shape.

10. The flight unit of claim 1, wherein the framework structure comprises six outer framework struts to form an outer, polygon-shaped boundary and six inner framework struts to form an inner, star-shaped framework structure.

11. The flight unit of claim 1, wherein the flight unit is configured to be capable of being coupled with a transport unit of any aircraft by a controllable coupling device.

12. A flight unit for a vertically take-off and landing aircraft, wherein the flight unit comprises several drive units arranged on a framework structure comprising longitudinally extended framework struts interconnected at fixed node points, wherein at least some of the framework struts comprise at least one wing of an aerofoil shape that is arranged or configured to be rotatable relative to a wing section of the framework strut and/or relative to at least one support section of the framework strut, and wherein at least some of the several drive units comprise at least one turbine propeller.

13. A flight unit for a vertically take-off and landing aircraft, wherein the flight unit comprises several drive units arranged on a framework structure comprising longitudinally extended framework struts interconnected at fixed node points, wherein at least some of the framework struts comprise at least one wing of an aerofoil shape that is arranged or configured to be rotatable relative to a wing section of the framework strut and/or relative to at least one support section of the framework strut, and wherein wings are distributed within the framework structure at different framework struts in such a way that a pair of wings associated with outer framework struts and a pair of wings associated with inner framework struts are symmetrically opposite to one another as viewed from a central axis of the flight unit.

* * * * *